(12) United States Patent
Meng et al.

(10) Patent No.: US 11,255,790 B2
(45) Date of Patent: Feb. 22, 2022

(54) FLUID DETECTION PANEL WITH FILTER STRUCTURE AND FLUID DETECTION DEVICE WITH FILTER STRUCTURE

(71) Applicant: BOE TECHNOLOGY GROUP CO., LTD., Beijing (CN)

(72) Inventors: Xianqin Meng, Beijing (CN); Wei Wang, Beijing (CN); Xiaochuan Chen, Beijing (CN); Xiandong Meng, Beijing (CN); Fangzhou Wang, Beijing (CN); Qiuyu Ling, Beijing (CN); Yishan Tian, Beijing (CN); Peilin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 40 days.

(21) Appl. No.: 16/632,668

(22) PCT Filed: Jan. 8, 2019

(86) PCT No.: PCT/CN2019/070858
§ 371 (c)(1),
(2) Date: Jan. 21, 2020

(87) PCT Pub. No.: WO2020/142902
PCT Pub. Date: Jul. 16, 2020

(65) Prior Publication Data
US 2020/0232910 A1 Jul. 23, 2020

(51) Int. Cl.
*G01N 21/64* (2006.01)
*G01N 21/25* (2006.01)
(Continued)

(52) U.S. Cl.
CPC .... *G01N 21/6454* (2013.01); *B01L 3/502715* (2013.01); *G01N 21/255* (2013.01); *G01N 21/274* (2013.01); *G02F 1/133509* (2013.01)

(58) Field of Classification Search
CPC ............... G01N 21/255; G01N 21/274; G01N 2021/0346; G01N 21/31; G01N 21/63;
(Continued)

(56) References Cited

U.S. PATENT DOCUMENTS 5,959,292 A 9/1999 Duveneck et al.
6,986,837 B2 1/2006 Chow et al.
(Continued)

FOREIGN PATENT DOCUMENTS

CN 1149336 A 5/1997
CN 1323393 A 11/2001
(Continued)

OTHER PUBLICATIONS

International Search Report of PCT/CN2019/070858 dated Sep. 30, 2019 with English translation.
(Continued)

*Primary Examiner* — Michael P LaPage
(74) *Attorney, Agent, or Firm* — Collard & Roe, P.C.

(57) ABSTRACT

A fluid detection panel and a fluid detection device are disclosed. The fluid detection panel includes a fluid-driven substrate, a filter structure and a sensor. The filter structure is configured to filter light emitted by a light source; the fluid-driven substrate comprises a detection area, and is configured to enable a liquid sample to move to the detection area; the sensor is configured to receive light which is emitted by the light source and sequentially passes the filter structure and the detection area.

18 Claims, 17 Drawing Sheets

(51) Int. Cl.
*G02F 1/1335* (2006.01)
*G01N 21/27* (2006.01)
*B01L 3/00* (2006.01)

(58) Field of Classification Search
CPC ............ G01N 21/05; G01N 2021/056; G01N 2021/058; G01N 2021/052; G01N 21/6454; G02F 1/133509; G02F 2203/055; G02F 1/1313; B01L 3/502715
See application file for complete search history.

(56) References Cited

U.S. PATENT DOCUMENTS

| | | | |
|---|---|---|---|
| 7,718,130 B1 * | 5/2010 | Shinar | G01N 21/6454 422/82.07 |
| 9,013,704 B2 | 4/2015 | Garcia Da Fonseca | |
| 9,138,913 B2 | 9/2015 | Arai | |
| 9,274,104 B2 | 3/2016 | Tono et al. | |
| 9,417,186 B2 | 8/2016 | Jakoby | |
| 2004/0112442 A1 | 6/2004 | Maerkl et al. | |
| 2006/0045809 A1 | 3/2006 | Shirai et al. | |
| 2009/0009756 A1 * | 1/2009 | Yamamichi | G01N 21/554 356/246 |
| 2012/0045787 A1 * | 2/2012 | Boettiger | G01N 21/03 435/29 |
| 2012/0213669 A1 | 8/2012 | Kasai et al. | |
| 2012/0214707 A1 | 8/2012 | Ymeti et al. | |
| 2013/0114079 A1 | 5/2013 | Zheng et al. | |
| 2013/0161533 A1 * | 6/2013 | Shin | G01N 21/6452 250/458.1 |
| 2013/0203613 A1 | 8/2013 | Burmeister et al. | |
| 2013/0309779 A1 | 11/2013 | Kasai et al. | |
| 2014/0198313 A1 | 7/2014 | Tracy et al. | |
| 2014/0274747 A1 * | 9/2014 | Kain | C12Q 1/6874 506/3 |
| 2015/0177125 A1 | 6/2015 | Kasai | |
| 2015/0276600 A1 * | 10/2015 | Tamaki | G01N 21/6454 506/13 |
| 2016/0341656 A1 * | 11/2016 | Liu | G01N 27/414 |
| 2017/0102530 A1 * | 4/2017 | Chang | G02B 21/0008 |
| 2019/0088463 A1 * | 3/2019 | Li | G01N 21/05 |
| 2019/0212295 A1 * | 7/2019 | Dehlinger | G06K 9/6202 |
| 2019/0369007 A1 | 12/2019 | Tan et al. | |
| 2019/0376899 A1 * | 12/2019 | Borthakur | G01N 21/6486 |
| 2019/0383738 A1 * | 12/2019 | Sato | G01N 21/645 |

FOREIGN PATENT DOCUMENTS

| | | |
|---|---|---|
| CN | 1546990 A | 11/2004 |
| CN | 1727892 A | 2/2006 |
| CN | 1867795 A | 11/2006 |
| CN | 101451995 A | 6/2009 |
| CN | 101533159 A | 9/2009 |
| CN | 101699271 A | 4/2010 |
| CN | 102230986 A | 11/2011 |
| CN | 102460127 A | 5/2012 |
| CN | 102713578 A | 10/2012 |
| CN | 103323395 A | 9/2013 |
| CN | 103424554 A | 12/2013 |
| CN | 104290319 A | 1/2015 |
| CN | 104535541 A | 4/2015 |
| CN | 104729993 A | 6/2015 |
| CN | 104854443 A | 8/2015 |
| CN | 104977274 A | 10/2015 |
| CN | 105699294 A | 6/2016 |
| CN | 106770043 A | 5/2017 |
| CN | 107255710 A | 10/2017 |
| CN | 108760644 A | 11/2018 |
| CN | 108918433 A | 11/2018 |
| CN | 108956469 A | 12/2018 |
| CN | 108993620 A | 12/2018 |
| EP | 2506014 A3 | 12/2012 |
| EP | 1664601 B1 | 10/2016 |
| JP | 2008096454 A | 4/2008 |

OTHER PUBLICATIONS

Notice of Allowance of U.S. Appl. No. 16/515,552 dated Jul. 18, 2019 (17 pages).
First Office Action in China Patent Office of CN2019100446744 dated Dec. 17, 2020 with English Translation.
Second Office Action in China Patent Office of CN2019100446744 dated Jun. 10, 2021 with English Translation.
Search Report of CN2019100446744 dated Jan. 17, 2019 with English Translation.

* cited by examiner

FLUID DETECTION PANEL WITH FILTER STRUCTURE AND FLUID DETECTION DEVICE WITH FILTER STRUCTURE

CROSS REFERENCE TO RELATED APPLICATIONS

This application is the National Stage of PCT/CN2019/070858 filed on Jan. 8, 2019, the disclosure of which is incorporated by reference.

TECHNICAL FIELD

Embodiments of the present disclosure relates to a fluid detection panel and a fluid detection device.

BACKGROUND

A spectrometer can extract desired monochromatic light from light (for example, white light) with a complicated composition and then the monochromatic light can be used to measure a sample. As a technology for accurately controlling and manipulating microscale fluid, microfluidics technology can integrate basic operation units, such as units of sample preparation, reaction, separation and detection, for biochemical analysis processes into a micrometer-scale chip, so as to automatically realize an analysis process. The microfluidic technology has the advantages of low sample consumption, fast detection speed, simple and convenient operation, multi-functional integration, small size, portability, etc., and has a great application potential in fields of biology, chemistry, medicine, or the like.

SUMMARY

At least one embodiment of the present disclosure provides a fluid detection panel, and the fluid detection panel comprises a filter structure, a fluid-driven substrate and a sensor. The filter structure is configured to filter light emitted by a light source; the fluid-driven substrate comprises a detection area and is configured to enable a liquid sample to move to the detection area; the sensor is configured to receive light which is emitted by the light source and sequentially passes the filter structure and the detection area.

For example, in at least one example of the fluid detection panel, the fluid-detection substrate comprises a plurality of driving electrodes, and the plurality of driving electrodes are configured to be able to drive the liquid sample to move to the detection area.

For example, in at least one example of the fluid detection panel, the fluid detection panel further comprises the light source. The filter structure is between the light source and the detection area.

For example, in at least one example of the fluid detection panel, the detection area comprises a plurality of sub-detection areas; the filter structure comprises a plurality of sub-filter structures; and an orthographic projection of each of the plurality of sub-filter structures on the fluid-driven substrate overlaps one of the plurality sub-detection areas.

For example, in at least one example of the fluid detection panel, the light source comprises a plurality of sub-light sources, and each of the plurality of sub-light sources is configured to emit light towards one of the plurality sub-detection areas.

For example, in at least one example of the fluid detection panel, at least one of the plurality of sub-filter structures comprises a liquid crystal layer and control electrodes; and the control electrodes are configured to receive a driven voltage signal, so as to control a peak transmission wavelength of the at least one of the plurality of sub-filter structures.

For example, in at least one example of the fluid detection panel, in a direction perpendicular to the fluid-detection substrate, the control electrodes are at a single side of the liquid crystal layer or at two sides of the liquid crystal layer.

For example, in at least one example of the fluid detection panel, the fluid detection panel further comprises a light shielding pattern. The light shielding pattern is between adjacent two sub-filter structures of the plurality of sub-filter structures.

For example, in at least one example of the fluid detection panel, the fluid detection panel further comprises a control device. The control device is configured to apply the driven voltage signal to the control electrodes, and is configured to enable adjacent sub-light sources to emit light at different time.

For example, in at least one example of the fluid detection panel, a distance between adjacent sub-detection areas is greater than a size of each of the plurality of sub-detection areas.

For example, in at least one example of the fluid detection panel, the filter structure further comprises a filter; and the filter and the at least one of the plurality of sub-filter structures are stacked with each other, so as to filter light emitted by a sub-light source, or to filter light that passes and exited from at least one of the filter structure.

For example, in at least one example of the fluid detection panel, the filter structure is configured to reflect at least part of light that is emitted by the light source and within a pre-determined wavelength range, and to transmit light that is emitted by the light source and outside of the pre-determined wavelength range.

For example, in at least one example of the fluid detection panel, the detection area comprises a plurality of sub-detection areas; the filter structure comprises a plurality of sub-filter structures; and an orthographic projection of each of the plurality of sub-filter structures on the fluid-driven substrate overlaps one of the plurality sub-detection areas.

For example, in at least one example of the fluid detection panel, at least one of the plurality of sub-filter structures comprises a grating; a period of the grating is smaller than a wavelength of light within the pre-determined wavelength range.

For example, in at least one example of the fluid detection panel, at least two sub-filter structures in the plurality of sub-filter structures are configured to reflect beams of light within different wavelength ranges.

For example, in at least one example of the fluid detection panel, the sub-filter structure further comprises an optical waveguide structure; and the grating is on a surface of the optical waveguide structure facing toward the fluid-driven substrate.

For example, in at least one example of the fluid detection panel, the optical waveguide structure is configured to leak at least part of light that enters the optical waveguide structure and is within the pre-determined wavelength range, and allow leaked light to interfere with light that is reflected by the sub-filter structure and within the pre-determined wavelength range, so as to enhance the light that is reflected by the sub-filter structure and within the pre-determined wavelength range.

For example, in at least one example of the fluid detection panel, the fluid detection panel further comprises the light source. The light source is between the filter structure and the sensor.

For example, in at least one example of the fluid detection panel, the fluid detection panel further comprises a first light shielding structure and a second light shielding structure. The first light shielding structure is between the fluid-driven substrate and the optical waveguide structure, and an orthographic projection of the first light shielding structure on the optical waveguide structure does not overlap with the grating; and the second light shielding structure is at a side of the optical waveguide structure away from the grating.

At least one embodiment of the present disclosure provides a fluid detection device, which comprises a signal processing device, and a fluid detection panel provided by any embodiment provided by the present disclosure. The signal processing device is connected with the sensor of the fluid detection panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
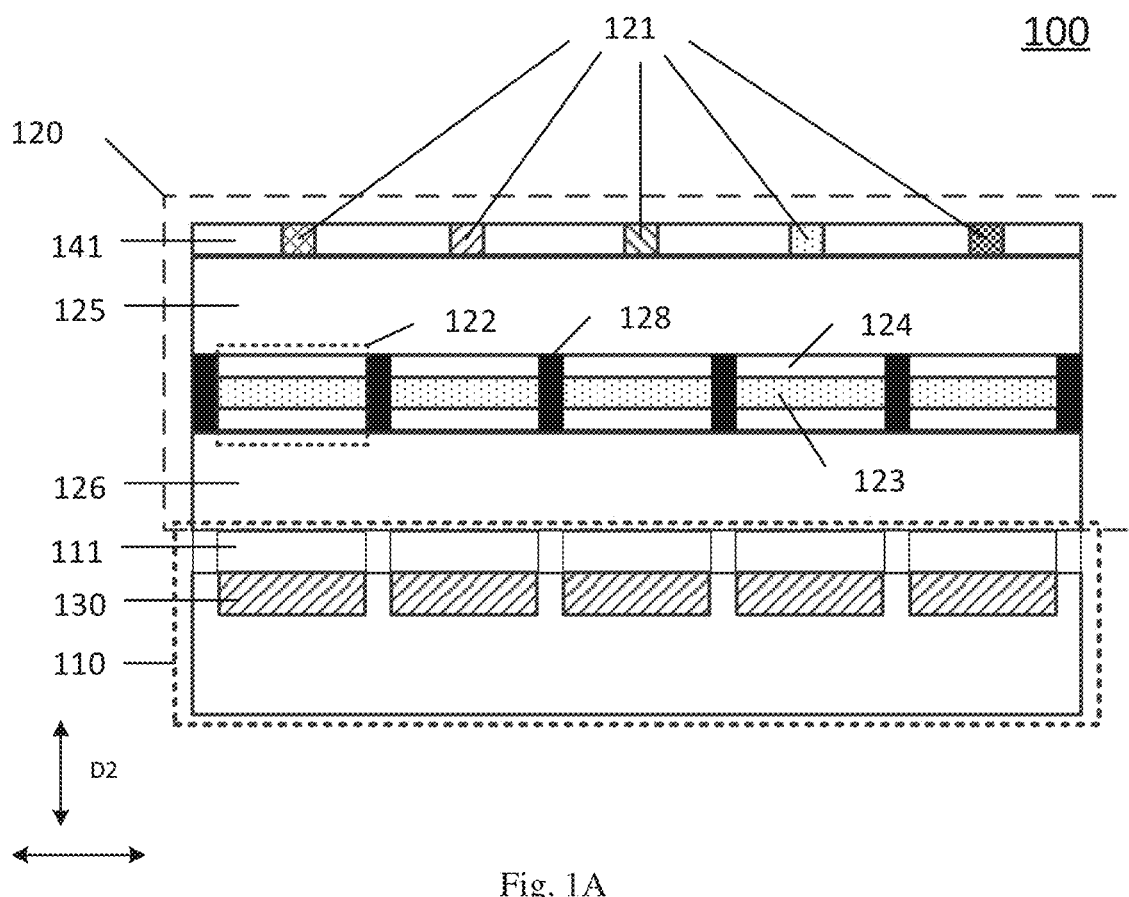
FIG. 1A is a cross-sectional view of a fluid detection panel provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Spectrum analysis is a method to identify a substance and determine the chemical composition and relative content of the substance according to the spectrum of the substance. Each element has its own identification spectral line. By comparing the spectrum generated by a certain substance with known spectral lines of known elements, the elements that constitute the certain substance can be determined. The spectrum not only can qualitatively analyze the chemical composition of the substance, but also can determine the contents of the elements. The spectrum analysis method has advantages of high sensitivity and high accuracy. Spectrum analysis can be divided into emission spectrum analysis and absorption spectrum analysis. Emission spectrum analysis calculates the content of elements to be measured in a sample to be measured according to the intensity of the characteristic spectrum emitted by the sample to be measured (for example, the sample to be measured includes the elements to be measured and a matrix substance) in excited state. Absorption spectrum analysis calculates the contents of elements to be measured in a sample to be measured according to the absorption spectrum (for example, the absorption characteristic spectrum) of the sample to be measured (for example, the elements to be measured). Here, the absorption spectrum can be obtained according to the absorption intensity of different wavelengths in the light that passes through the sample to be measured.

The inventors of the present disclosure have noticed during research that current spectrum analysis is realized by a spectrometer. However, current spectrometer includes free-space optical elements (such as a prism, a lens, a grating, etc.), which causes current spectrometer to be usually large in size and expensive, and cause the sample to be detected to be usually measured in a laboratory, thereby limiting the application field of the spectrometer and the spectrum analysis. For example, current spectrometer is difficult to be used in combination with the microfluidic substrate (for example, a microfluidic passage).

Some embodiments of the present disclosure provides a fluid detection panel. The fluid detection panel includes a filter structure, a fluid-driven substrate and a sensor. The filter structure is configured to filter light emitted by a light source; the fluid-driven substrate comprises a detection area and is configured to enable a liquid sample to move to the detection area; the sensor is configured to receive light which is emitted by the light source and sequentially passes the filter structure and the detection area.

In some examples, the fluid detection panel may further comprise a light source, and the light source and the filter structure are combined with each other to form an optical unit. For the sake of clarity, embodiments of the present disclosure is described by taking the case where the fluid detection panel further comprises the light source as an example, but embodiments of the present disclosure are not limited to this case. For example, the fluid detection panel may provide no light source, in this case, the user can configure the light source by themselves, or use the ambient light as the light source.

In some embodiments provided by the present disclosure, through integrating a fluid-driven substrate and a spectrometer into the fluid detection panel, detection of a small amount or even a trace amount liquid sample can be realized, such that spectroscopic detection, substance analysis, calibration, molecular diagnostics, food quarantine, and bacteria classification, or the like, which involve the field of physics, biology, chemistry, medicine and agriculture, can be realized.

Non-limitative descriptions are given to the fluid detection panel provided by the embodiments of the present disclosure in the following with reference to a plurality of examples. As described in the following, in case of no conflict, different features in these specific examples can be combined so as to obtain new examples, and the new examples are also fall within the scope of present disclosure.

Figure 1B:
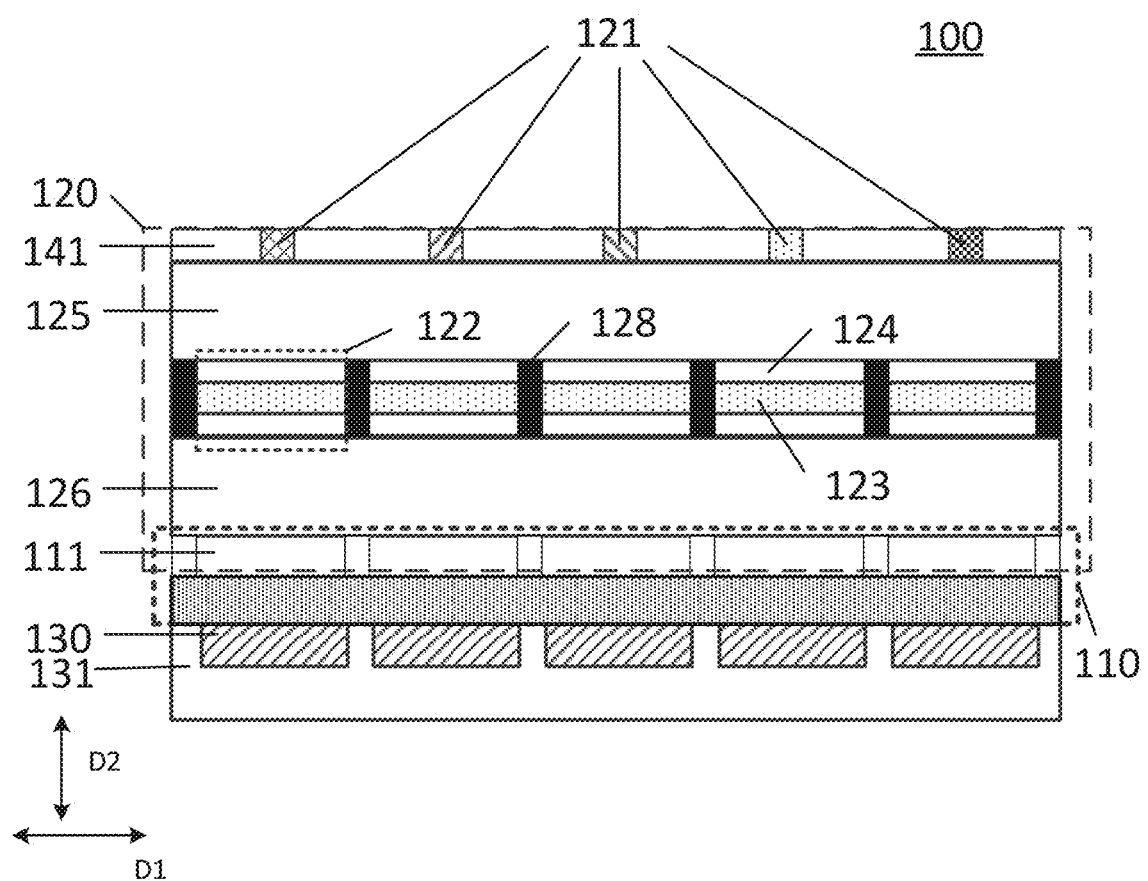
FIG. 1B is a cross-sectional view of a fluid detection panel provided by at least one embodiment of the present disclosure.

FIG. 1A is a cross-sectional view of a fluid detection panel 100 provided by at least one embodiment of the present disclosure; FIG. 1B is a cross-sectional view of a fluid detection panel 100 provided by at least one embodiment of the present disclosure. As illustrated in FIG. 1A and FIG. 1B, the fluid detection panel 100 comprises a fluid-driven substrate 110, an optical unit 120 and a plurality of sensors 130, and the fluid detection panel 100 as illustrated in FIG. 1B further comprises a sensor substrate 131. The optical unit 120 is on the fluid-driven substrate 110, in operation, the light emitted by the optical unit 120 illuminates the sample on the fluid-driven substrate 110, and then is collected by the plurality of sensors 130, such that detection function is realized.

Figure 2:
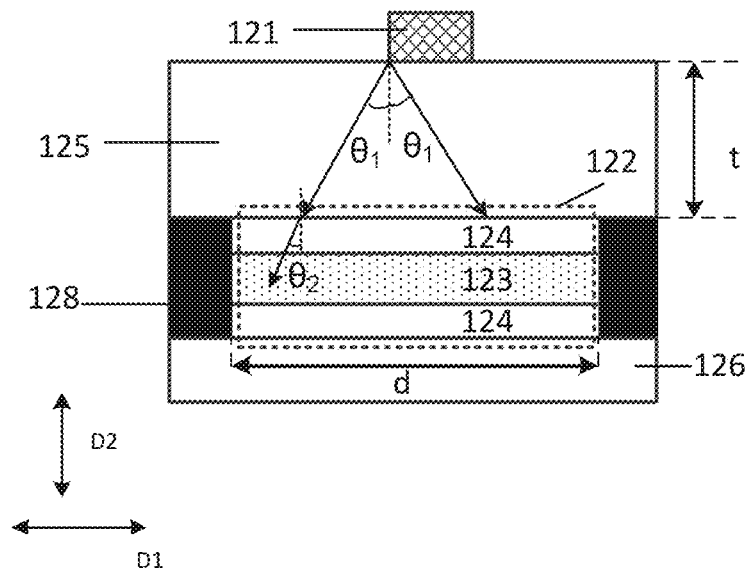
FIG. 2 is a cross-sectional view of an optical unit.

FIG. 2 illustrates a cross-sectional view of a partial region of an optical unit 120. As illustrated in FIG. 2, the optical unit 120 is above the fluid-driven substrate 110, such that the light emitted by the optical unit 120 can illuminate a detection area, that is, the optical unit 120 can provide detection light for the detection area. The optical unit 120 comprises a filter structure configured to filter the light emitted by a light source, and the filter structure is between the light source and the detection area. As illustrated in FIG. 2, the light source comprises a plurality of sub-light sources 121, the filter structure comprises a plurality of sub-filter structures 122, and the detection area comprises a plurality of sub-detection areas 111.

It should be noted that, for the sake of clarity, illustrative descriptions are given in the present disclosure by taking, as an example, the case where the light source comprises a plurality of sub-light sources 121, the filter structure comprises a plurality of sub-filter structures 122, and the detection area comprises a plurality of sub-detection areas 111, but embodiments of the present disclosure are not limited to this case. In some examples, the light source may comprise one sub-light source 121, the filter structure may comprise one sub-filter structure 122, and the detection area may comprise one sub-detection area 111.

For example, the plurality of sub-light sources 121 and the plurality of sub-filter structures 122 are in one-to-one correspondence. Each of the plurality of sub-light sources 121 is configured to emit light toward a corresponding sub-filter structure 122, the sub-filter structure 122 is configured to filter the light emitted by a corresponding sub-light source 121, and the filtered light exits from the sub-filter structure 122 and illuminates on a corresponding sub-detection area 111.

For example, the sub-light source 121 may be a monochrome light source or a polychromatic light source. For example, in the case where the sub-light source 121 is a monochrome light source, the light emitted by the sub-light source 121 may be any one of red light, green light, blue light, violet light, infrared light and ultraviolet light. For example, in the case where the sub-light source 121 is a polychromatic light source, the light emitted by the sub-light source 121 may be white light or other mixed light. For example, the sub-light source 121 may be at least one of an inorganic light emitting diode (for example, micro-LED), an organic light emitting diode, and a laser diode, but embodiments of the present disclosure are not limited to this case.

As illustrated in FIG. 2, the light emitted by the sub-light source 121 may have a pre-determined divergence angle (i.e., the light emitted by the sub-light source 121 is non-collimated light, and the sub-light source 121 may be a non-collimated light source). Because the price of a non-collimated light is lower than the price of a collimated light, adopting of a light source with a pre-determined divergence angle reduces the cost of the sub-light source 121 and the fluid detection panel 100. In an example, an optical component (for example, a lens) may be provided to collimate the light emitted by the sub-light source 121, so as to enable light that is incident on the sub-filter structure 122 to be substantially parallel. For example, as illustrated in FIG. 2, the sub-light source 121 may be exactly opposite to the sub-filter structure 122, and the line connecting the center of the sub-light source 121 and the center of the sub-filter structure 122, is, for example, perpendicular to the plane where the fluid detection panel 100 is located. For another example, the sub-light source 121 may opposite to an end of the sub-filter structure 122.

As illustrated in FIG. 2, in some embodiments of the present disclosure, the sub-filter structure 122 comprises a liquid crystal layer 123 and control electrodes 124. For example, through adopting a liquid-crystal type filter structure, filtering of the light emitted by the sub-light source 121 can be realized without providing an optical component (for example, a grating and a lens) with a large size, such that the size of the fluid detection panel 100 can be reduced. For example, the fluid detection panel 100 provided by some embodiments of the present disclosure may be implemented as a micro-spectrometer. For example, the sub-filter structure 122 filters the light emitted by the sub-light source 121 through the liquid crystal layer 123 and the control electrodes 124, which are mature in technology and have low cost, such that the device entirety is suitable for mass production.

The control electrodes 124 are configured to receive a driven voltage signal, so as to control the peak transmission wavelength of the sub-filter structure 122. For example, the optical unit 120 further comprises a control device (not illustrated in FIG. 2). The control device is configured to apply the driven voltage signal to the control electrodes 124, so as to control the peak transmission wavelength of the sub-filter structure 122. The side of the sub-filter structure 122 closer to the sub-light source 121 is a light-incident side, and the side of the sub-filter structure 122 away from the sub-light source 121 is a light-exiting side.

It should be noted that, although each of the plurality of sub-filter structures 122 as illustrated in FIG. 1A may be implemented as a liquid-crystal type filter structure, but embodiments of the present disclosure are not limited to this case. In some examples, part of the sub-filter structures 122 (for example, one sub-filter structure 122) as illustrated in FIG. 1A may be implemented as a liquid-crystal type filter structure, and no further description will be given here.

In the following, the structure and the filtering principle of the above-mentioned liquid-crystal type filter structure are illustratively described with reference to FIG. 2.

As illustrated in FIG. 2, the control electrodes 124 are provided at two sides of the liquid crystal layer 123, respectively. For example, the liquid crystal material may adopt a blue phase liquid crystal material or a liquid crystal material suitable for any one of the following modes: a twisted nematic (TN) mode, a vertical alignment mode, an in-plane switching (IPS) mode, an advanced super dimension switch (ADS) mode, and a fringe field switching mode (FFS).

In the case where the control electrodes 124 receive the driven voltage signal, the control electrodes 124 form an electrical field with a pre-determined intensity. The electrical field drives the liquid crystal molecules in the liquid crystal layer 123 to perform corresponding rotation according to the driven voltage signal. Therefore, the refractive index of the liquid crystal layer 123 is modulated correspondingly, and is changed along with the change of the driven voltage signal. For example, the adjustable range of the refractive index of the liquid crystal layer 123 can be relatively large (for example, the difference between the maximum refractive index and the minimum refractive index of the liquid crystal layer 123 is greater than 0.29). For example, the peak wavelength and the full width at half maximum (FWHM) of the filtered light which passes the sub-filter structure 122 is relevant with the thickness of the liquid crystal layer 123. For example, the thickness of the liquid crystal layer 123 is about 3 microns, but embodiments of the present disclosure are not limited to this case. For example, in designing the thickness of the liquid crystal layer 123, the electrical performance and driven signal parameters of the sub-filter structure 122 can be taken into consideration, and no further description will be given here. For example, in the case where the optical unit 120 comprises a plurality of sub-filter structures 122, the thickness of the liquid crystal layer 123 of the sub-filter structure 122 can be set to be consistent (for example, to be the same). In this case, for example, the manufacturing process can be simplified and a plurality of types of monochromatic light with different wavelengths can be obtained continuously.

In an example, the control electrodes 124 can be made of a metal material (for example, silver, aluminum or molybdenum). For example, the thickness (the thickness in the direction perpendicular to the plane where the fluid detection panel 100 is located, that is, the thickness in the second direction D2) of the control electrodes 124 are about several microns to tens of microns. The control electrodes 124 are not only used for driving the liquid crystal molecules of the liquid crystal layer 123 to rotate, but also used for forming a Fabry-Perot (F-P) cavity, the light which enters the F-P cavity is oscillated back and forth in the F-P cavity a plurality of times, and then the F-P cavity output filtered light, and the full width at half maximum of the filtered light is smaller than the full width at half maximum of the light emitted by the sub-light source 121. In the case where the voltage that is applied to the liquid crystal layer 123 via the control electrodes 124 are changed, the rotation degrees of the liquid crystal molecules in the liquid crystal layer 123 are changed, and therefore, the refractive index of the liquid crystal layer 123 filled in the F-P cavity is changed, and the peak wavelength of the filtered light which passes the liquid crystal layer is changed. For example, through controlling (for example, precisely controlling) the driven voltage signal applied to the control electrodes 124, the peak wavelength of the light (i.e., the filtered light) that is outputted by the sub-filter structure 122 can be changed.

For example, in the case where a first driven voltage signal is applied to the control electrodes 124, the refractive index of the liquid crystal molecules in the liquid crystal layer 123 is a first refractive index, correspondingly, the peak wavelength of the light outputted by the sub-filter structure 122 is a first wavelength; in the case where the second driven voltage signal is applied to the control electrodes 124, the refractive index of the liquid crystal molecules in the liquid crystal layer 123 is a second refractive index, correspondingly, the peak wavelength of the light outputted by the sub-filter structure 122 is a second wavelength; here, the first driven voltage signal is not equal to the second driven voltage signal, the first refractive index is not equal to the second refractive index, and the second wavelength is not equal to the first wavelength. For example, in the case where the driven voltage signal applied to the control electrodes 124 are changed continuously, the peak wavelength of the light outputted by the sub-filter structure 122 can be adjusted continuously as well. For example, the sub-filter structure 122 as illustrated in FIG. 2 can provide light with a peak wavelength that is within a special wavelength range (for example, light that is difficult to obtain through an ordinary filter structure). For example, the sub-filter structure 122 provided by some embodiments of the present disclosure can provide light with a narrow and electrically adjustable full width at half maximum. When applying the light with a narrow and electrically adjustable full width at half maximum in measuring a sample, the measurement accuracy of the fluid detection panel 100 can be improved and the types of samples that can be measured by the fluid detection panel 100 can be increased.

For example, in the case where the optical unit 120 comprises a plurality of sub-filter structures 122, the parameters of the plurality of sub-filter structures 122 may be, for example, the same, such that the manufacturing process can be simplified; in this case, even though the physical parameters of the plurality of sub-filter structures 122 are the same, however, different driven voltage signals can be applied to different sub-filter structures 122. Therefore, the peak wavelengths of the filtered light outputted by different sub-filter structures 122 can be different, such that the applied range of the device including the sub-filter structures 122 can be widened.

In another example, the control electrodes 124 are made of a transparent conductive material (for example, indium tin oxide, ITO), and the thickness of the control electrodes 124 may be minimized. For example, the thickness of the transparent conductive material is about 100 nanometers or 50 nanometers. In this case, the structure of the control electrodes may refer to the control electrodes which are made of a metal material, and no further description will be given here. For example, the control electrodes 124 are not limited to only comprise a transparent oxide layer, according to specific implementation needs, the control electrodes 124 may further comprise a sliver layer, that is, the control electrodes 124 may be implemented as a laminated layer of a sliver layer and a transparent oxide layer. For example, compared with the sliver layer, the transparent oxide layer is closer to the liquid crystal layer 123.

In some embodiments, the control electrodes 124 may be made of a conductive material with a refractive index to be approximately equal to 1.46. The control electrodes may be a single layer conductive layer made of the same material, and may also be a laminated structure formed by a sliver layer and an ITO layer.

For example, as illustrated in FIGS. 1A, 1B and 2, the optical element 120 further includes a first optical substrate 125 and a second optical substrate 126 disposed opposite to each other, and the second optical substrate 126 is closer to the fluid-driven substrate 110 than the first optical substrate 125. As illustrated in FIG. 2, the liquid crystal layer 123 is sandwiched between the first and second optical substrates 125 and 126; the control electrodes 124 are provided between the first and second optical substrates 125 and 126; and part of the control electrodes 124 are provided on the first optical substrate 125, and another part of the control electrodes 124 are provided on the second optical substrate 126.

For example, the sub-filter structure 122 may be obtained by the following method. First, the control electrodes 124 may be formed on the first and second optical substrates 125 and 126 respectively, the control electrodes may have a predetermined pattern (for example, the control electrodes 124 may be a planar electrode or a slit electrode); and then, the first and second optical substrates 125 and 126 formed with the control electrodes may be disposed opposite to each other and can form a liquid crystal cell through a sealant; afterwards, in the process of forming the liquid crystal cell or after the liquid crystal cell is formed, a liquid crystal material may be injected between the first and second optical substrates 125 and 126, so as to form the liquid crystal layer 123.

For example, the first and second optical substrates 125 and 126 have a relatively high transmissivity (for example, greater than 90%) for the light emitted by the sub-light source 121. For example, the first and second optical substrates 125 and 126 may be a glass substrate, a quartz substrate, a plastic substrate (for example, a polyethylene terephthalate (PET) substrate), or a substrate made of other suitable materials. For example, the first and second optical substrates 125 and 126 may adopt a substrate suitable for applying in a liquid crystal display device or an organic light emitting diode display device, or adopt a substrate made of customized optical glass, a resin material, or the like. For example, the thicknesses of the first and second optical substrates 125 and 126 may be determined based on specific product designs or process conditions, and the thicknesses of the first and second optical substrates 125 and 126 are, for example, 0.1 millimeters to 2 millimeters. For example, the surfaces, which is perpendicular to the direction (that is, the second direction D2) perpendicular to the first optical substrate 125, of the first and second optical substrates 125 and 126 may have good planeness and parallelism. For example, the first and second optical substrates 125 and 126 may adopt optical glass with a refractive index of about 1.46.

Figure 3A:
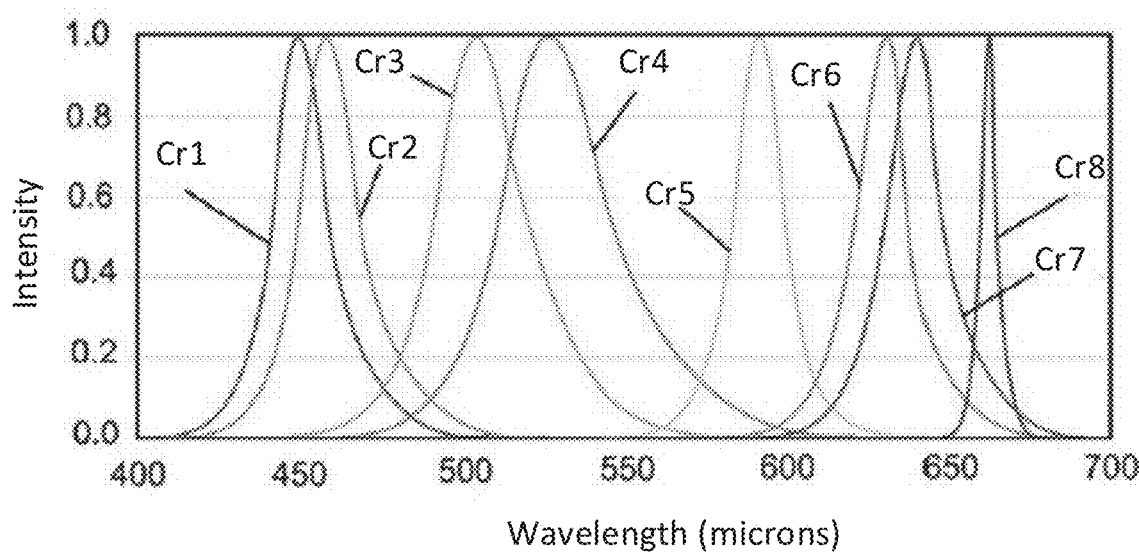
FIG. 3A is a diagram illustrating a relative spectrum distribution of light emitted by an LED.

For example, simulation can be performed by taking light-emitting diodes (LEDs) from LUXEON Company as the sub-light sources 121, so as to design and optimize the parameters of the optical unit 120. For example, in the case where a driven current is 500 mA, and a working temperature is kept at 25° C., the relative spectrum distribution of the light emitted by an LED from LUXEON Company is illustrated in FIG. 3A. For example, as illustrated in FIG. 3A, the spectral amplitude is normalized, and the unit of longitudinal axis is an arbitrary unit. The light emitted by the LED comprises a first emission peak Cr1, a second emission peak Cr2, a third emission peak Cr3, a fourth emission peak Cr4, a fifth emission peak Cr5, a sixth emission peak Cr6, a seventh emission peak Cr7 and an eight emission peak Cr8. The first emission peak Cr1, the second emission peak Cr2, the third emission peak Cr3, the fourth emission peak Cr4, the fifth emission peak Cr5, the sixth emission peak Cr6, the seventh emission peak Cr7 and the eight emission peak Cr8 are respectively located in a royal blue wavelength range, a blue wavelength range, a cyan wavelength range, a green wavelength range, an amber wavelength range, an orange wavelength range, a red wavelength range and a crimson wavelength range.

In some embodiments of the present disclosure, a nematic liquid crystal from Merck company with the model number of SLC123320 can be adopted as the material of the liquid crystal layer 123 in the optical unit 120. For light with the wavelength of 589 nanometers, the refractive index of the liquid crystal material with the model number of SLC123320 may be changed in the range of 1.522-1.821. The first optical substrate 125 and the second optical substrate 126 may adopt an optical glass with the refractive index to be approximately equal to 1.46, so as to maximize the difference between the refractive index of the first optical substrate 125 and the second optical substrate 126 and the minimum refractive index of the liquid crystal layer 123.

Figure 3B:
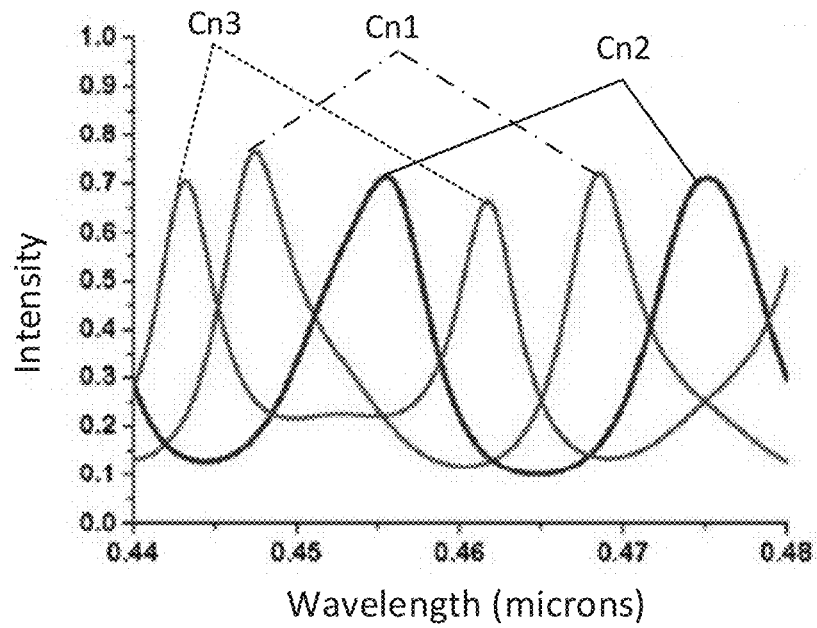
FIG. 3B illustrates spectrum distributions of filtered light outputted by a filter structure at different refractive index values.
Figure 3C:
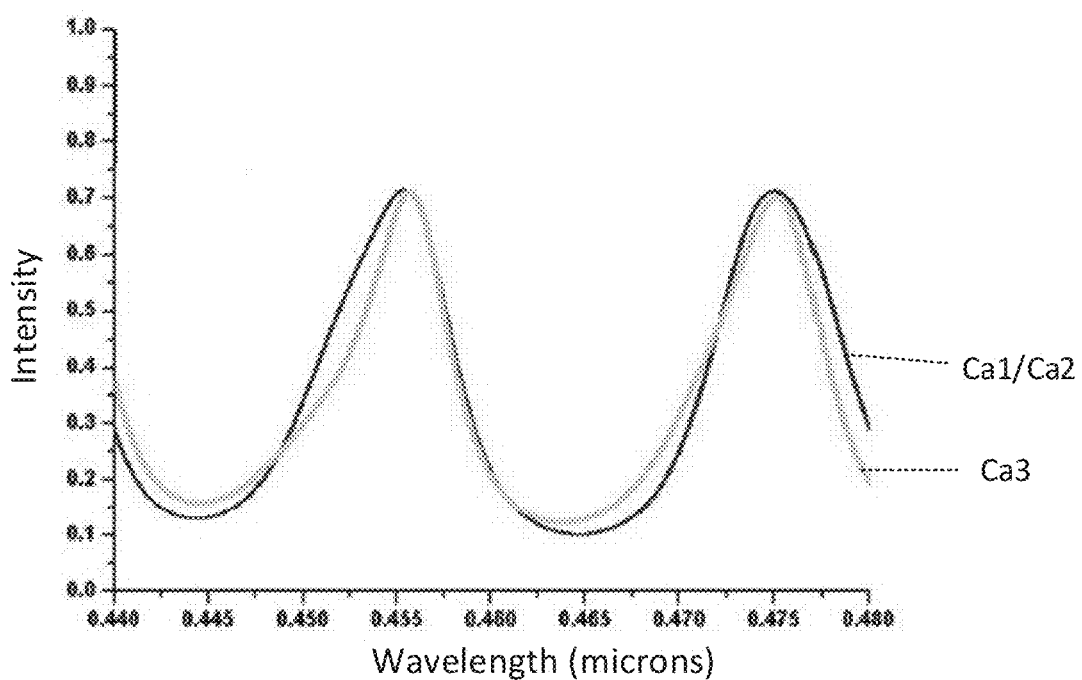
FIG. 3C illustrates a spectrum distribution of filtered light outputted by a filter structure at different light-incident angles.

For example, on the basis of the above-mentioned structure parameters, a software (FDTD Solution) for performing calculation of a finite difference time domain method is adopted to establish a model for the optical unit 120 as illustrated in FIG. 2, so as to design and optimize the parameters of the optical unit 120; the simulation results are illustrated in FIG. 3B and FIG. 3C. For example, in the above-mentioned model, the wavelength of the light outputted by the sub-light source 121 ranges from 440 nanometers to 480 nanometers. In practice, a filter may be adopted to obtain the light within the wavelength range of 440 nanometers-480 nanometers through filtering from the light emitted by the LED from LUXEON Company. The filter may be a band pass filter which allows the light within the wavelength range of 440 nanometers-480 nanometers to pass through the band pass filter, and the band pass filter is between the sub-light source 121 and the sub-filter structure 122.

FIG. 3B illustrates the spectrum distributions of the light which passes and outputted by the sub-filter structure 122 in the case where the liquid crystal layer 123 presents different refractive indexes. As illustrated in FIG. 3B, in the case where the refractive index n of the liquid crystal layer 123 is equal to 1.6, first filtered light Cn1 is outputted from the sub-filter structure 122, and the first filtered light Cn1 comprises two spectrum peaks with the peak wavelengths respectively at 447 nanometers and 469 nanometers; in the case where the refractive index n of the liquid crystal layer 123 is equal to 1.7, second filtered light Cn2 is outputted from the sub-filter structure 122, and the second filtered light Cn2 comprises two spectrum peaks with the peak wavelengths respectively at 455 nanometers and 475 nanometers; in the case where the refractive index n of the liquid crystal layer 123 is equal to 1.8, third filtered light Cn3 is outputted from the sub-filter structure 122, and the third filtered light Cn3 comprises two spectrum peaks with the peak wavelengths respectively at 443 nanometers and 462 nanometers. As illustrated in FIG. 3B, the full width at half maximum of each of the spectrum peaks outputted by the sub-filter structure 122 is about 5-8 nanometers. However, as illustrated in FIG. 3A, the full width at half maximum of the blue light (the second emission peak Cr2) emitted by the sub-light source 121 is normally about 20-30 nanometers, that is, the full width at half maximum of the filtered light outputted by the sub-filter structure 122 is about one quarter of that of the light emitted by the sub-light source 121, this allows the spectral resolution of the light outputted from the sub-filter structure 122 to increase about four times.

FIG. 3C illustrates the spectrum distributions of filtered light outputted by the sub-filter structure 122 at different light-incident angles (the angle between the incident light and the normal direction of the sub-filter structure 122, that is, θ2 in FIG. 2). As illustrated in FIG. 3C, in the case where the light-incident angle θ2 is ±1 degrees, the sub-filter structure 122 outputs filtered light Ca1; in the case where the light-incident angle θ2 is ±2 degrees, the sub-filter structure 122 outputs filtered light Ca2; in the case where the light-incident angle θ2 is ±30 degrees, the sub-filter structure 122 outputs filtered light Ca3. The spectrum distribution of the filtered light Ca1 is substantially the same as the filtered light Ca2, and is very close to the spectrum distribution of the filtered light Ca3, this means that the sub-filter structure 122 is insensitive to the light-incident angle, and the impact of the collimation degree of the incident light on the parameter of the filtered light is relatively small.

In some examples, as illustrated in FIG. 1A, FIG. 1B and FIG. 2, the optical unit 120 further comprises a light shielding pattern 128, and the light shielding pattern 128 is between two adjacent (for example, any two adjacent) sub-filter structures 122. For example, the light shielding pattern 128 is configured to absorb the light which is emitted by the sub-light source 121 and has a relatively large angle, such that cross talk caused by a sub-light source 121 to other sub-filter structures 122, except for the sub-filter structure 122 which is opposite to the sub-light source 121, can be reduced, such that the detection accuracy of the fluid detection panel 100 can be increased. For example, the light shielding pattern 128 can further be configured to separate the liquid crystal molecules in adjacent filter structures, and to guarantee the degree of homogeneity of the thickness of the liquid crystal layer 123. For example, the material of the light shielding pattern 128 may be a dark organic material.

For example, the distance d between adjacent light shielding patterns 128 may be determined according to the distance between adjacent sub-light sources 121, and the distance between the first optical substrate 125 and the second optical substrate 126. For example, the width of the light shielding patterns 128 (the width in the first direction D1) may be obtained based on the energy distribution of the sub-light sources 121, the refractive index of the first optical substrate 125 and the thickness t of the first optical substrate 125. For example, the determination method of the width w of the light shielding patterns 128 and the distance d between adjacent light shielding patterns 128 are illustratively described in the following with reference to FIG. 4. For example, the first direction D1 is parallel to the plane where the first optical substrate 125 and/or the second optical substrate 126 are (is) located.

For example, the sub-light source 121 may be implemented as an LED, and the light emitted by the LED is incident on the first optical substrate 125 (the thickness t of the first optical substrate 125 is equal to 0.1 millimeters) after propagation in the air, the refractive index of the air and the refractive index of the first optical substrate 125 are respectively $n_1$ and $n_2$, $n_1$ is equal to 1, and $n_2$ is equal to 1.46. The angles between the light emitted by the LED and the normal (i.e., a virtual line perpendicular to the first optical substrate 125) of the first optical substrate 125 are respectively $\theta_1$ and $\theta_2$ before and after the light enters the first optical substrate 125, and $\theta_1$ and $\theta_2$ satisfy the following expression: $n_1 \times \sin \theta_1 = n_2 \times \sin \theta_2$, and therefore, it can be obtained that the maximum light-incident angle $\theta_{2\_max}$ of light that is emitted by the LED and allowed to be incident into the sub-filter structure 122 satisfies the following expression:

$$\theta_2 = \arcsin(n_1/n_2 \times \sin \theta_1).$$

Therefore, the distance d between adjacent light shielding patterns 128 satisfy the following expressions, that is, $$d = 2 \times t \times \tan \theta_{2\_max} + L,$$

where L is the maximum width of the light emitting face of the LED (for example, the width of the light emitting face of the LED in the first direction D1, which is assumed to be 10 microns).

Figure 4:
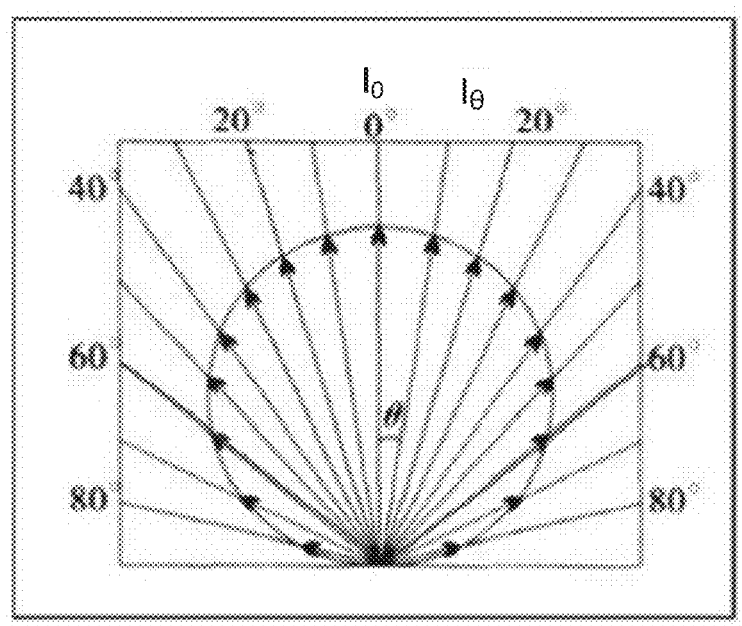
FIG. 4 is a diagram illustrating a distribution of a light intensity of light emitted by a Lambertian light source with respect to an exit angle.

FIG. 4 is a diagram illustrating the distribution of the light intensity of light emitted by a Lambertian light source with respect to an exit angle; the light intensity $I_\theta$ of the light emitted by the Lambertian light source and the exit angle θ satisfy the following expression: $I_\theta = I_0 \times \cos \theta$, here, $I_0$ is the light intensity of the light that is emitted by the LED along the direction perpendicular to the light emitting face of the LED. It can be obtained through the expression that is satisfied by the light intensity $I_\theta$ of the light emitted by the Lambertian light source and the exit angle θ, approximately 96% energy of the Lambertian light source is carried by the light with a divergence angle to be smaller than ±60°, and only 4% energy is carried by the light with a divergence angle to be greater than ±60°. Therefore, the maximum angle $\theta_1\_max$ between the light that is allowed to be entered into the sub-filter structure 122 and the normal of the first optical substrate 125 before the light enters the first optical substrate 125 may be configured to be ±60°. In this case, most of the light emitted by the Lambertian light source can be incident into the sub-filter structure 122, such that the efficiency of the fluid detection panel 100 can be improved. Correspondingly, it can be obtained that, the maximum light-incident angle $\theta_2\_max$ of the light that is allowed to be entered into the sub-filter structure 122 satisfies the following expression:

$$\theta_2\_max=\arcsin(1\times\sin(60)/1.46)=36.4°.$$

Therefore, the distance d between adjacent light shielding patterns 128=148 microns+10 microns=158 microns.

For example, in the case where the light shielding pattern 128 is desired to shield the light with the emission angle to be within the range of 60° to 80° and the range of −80° to −60°, the width w of the light shielding pattern 128 satisfies the following expression: w=t×tan (42.4)−t×tan (36.4)= 17.64 microns, here, after the light that is emitted by the LED and has the angle $\theta_1$ of 80° is incident into the first optical substrate 125, the angle $\theta_2$ of the light that is emitted by the LED and has the angle $\theta_1$ of 80° is 42.4°.

For example, referring to FIG. 1A and FIG. 1B, the plurality of sub-light sources 121 may be provided on the third optical substrate (not illustrated in figures), and the third optical substrate is configured to fix and support the plurality of sub-light sources 121. For example, the optical unit 120 may further comprise a second light shielding pattern 141, and the second light shielding pattern 141 is, for example, between adjacent sub-light sources 121, so as to absorb the light reflected by an interface. For example, the second light shielding pattern 141 can be configured to absorb the light reflected by the interface between the first optical substrate 125 and the control electrodes 124.

As illustrated in FIG. 2, in the case where the optical unit 120 comprises the plurality of sub-light sources 121, and each of the sub-light sources 121 is a monochrome light source, the plurality of monochrome light sources may comprise, for example, a violet light source, a blue light source, a blue-green light source, a green light source and a red light source which are sequentially arranged along the first direction D1, but embodiments of the present disclosure are not limited to this case. For example, according to specific implementation demands, an infrared sub-light source 121 and an ultraviolet sub-light source 121 may further be provided, such that the working wavelength range of the fluid detection panel 100 can be further increased, and therefore, the application range of the fluid detection panel 100 can be further widened.

In some examples, the plurality of sub-light sources 121 included by the optical unit 120 may emit light with the same color (for example, blue). In operation, for example, the plurality of sub-light sources 121 and the plurality of sub-filter structures 122 may be driven to work simultaneously. For another example, only part of the sub-light sources 121 and sub-filter structures 122 corresponding to the part of the sub-light sources 121 may be driven to work according to the positions and the number of the samples to be measured.

As illustrated in FIG. 1A and FIG. 1B, the fluid-driven substrate 110 comprises a sub-detection area 111, and the sub-detection area 111 is configured to enable a liquid sample to be moved to the sub-detection area 111, so as to perform operations such as detection. Concrete structures of the fluid-driven substrate 110 may be set according to specific implementation demands, and no specific limitation will be given in embodiments of the present disclosure in this respect.

Figure 5A:
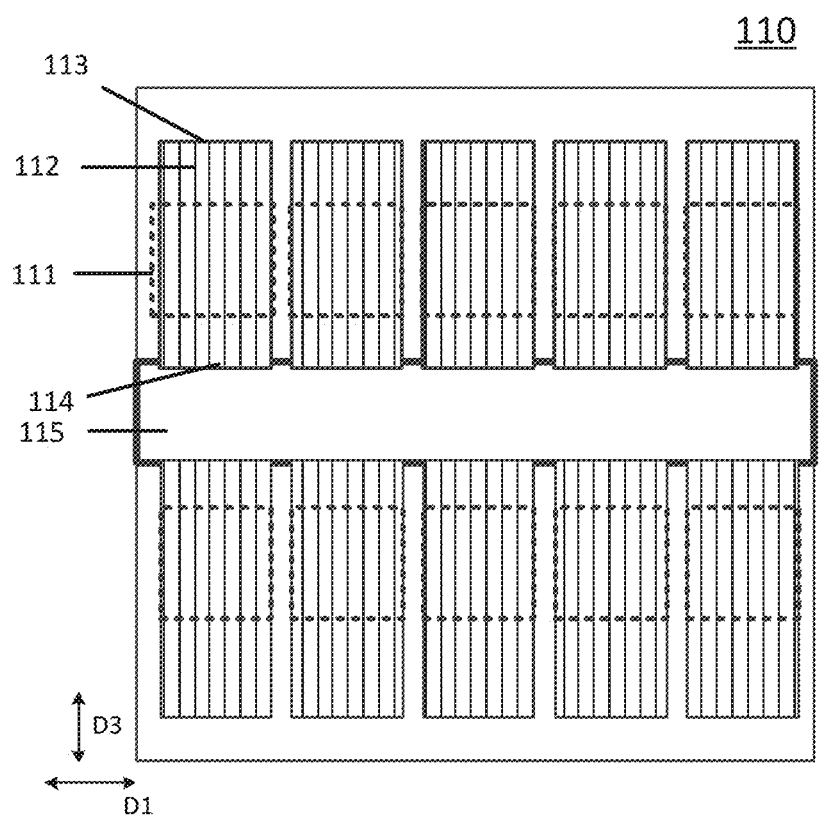
FIG. 5A is a plan view of a fluid-driven substrate provided by at least one embodiment of the present disclosure.

FIG. 5A illustrates a plan view of a fluid-driven substrate 110. As illustrated in FIG. 5A, the fluid-driven substrate 110 comprises a flowing space 112 for liquid sample (for example, a microflow passage) and a liquid tank 115. For example, the flowing space 112 may be separated by, for example, spacers, or the like, to assist the liquid to flow. The terminal end 114 of the flowing space 112 for liquid sample connects the liquid tank 115, and therefore, the liquid sample after detection can flow into the liquid tank 115 for temporary storage. The flowing space 112 for liquid sample extends along the third direction D3. The third direction D3 is perpendicular to the first direction D1 and the second direction D2. As illustrated in FIG. 5A, the fluid-driven substrate 110 comprises two rows of flowing spaces 112 for liquid sample, but embodiments of the present disclosure are not limited to this case.

The region, which is corresponding to the sub-filter structure 122, of the flowing space 112 for liquid sample comprises the sub-detection area 111 of the fluid-driven substrate 110. In operation, the liquid sample enters the flowing space 112 for liquid sample from the initial end 113 of the flowing space 112 for liquid sample; then the liquid sample flows into the sub-detection area 111 to be detected; finally, the liquid sample flows into the liquid tank 115 via the terminal end 114 of the flowing space for liquid sample. The fluid-driven substrate 110 comprises a plurality of driving electrodes, and the plurality of driving electrodes are configured to drive the liquid sample to move to the sub-detection area 111.

As illustrated in FIG. 1A and FIG. 1B, the second optical substrate 126 is opposite to the fluid-driven substrate 110 and is, for example, fixed with respect to the fluid-driven substrate 110 through methods such as adhering. For example, the second optical substrate 126 and the fluid-driven substrate 110 define the flowing space for liquid sample. For another example, the fluid detection panel 100 may further comprise a packaging film (not illustrated in FIG. 1A and FIG. 1B), the packaging film is between the fluid-driven substrate 110 and the sensor 130, so as to lower the requirement on the liquid sample (for example, allow the fluid detection panel 100 to be suitable for detecting a liquid sample with a relative small surface tension).

For example, the material of and the thickness of the fluid-driven substrate 110 provided by some embodiments of the present disclosure may be set according to specific implementation demands and no specific limitation will be given in embodiments of the present disclosure in this respect. For example, the fluid-driven substrate 110 may be made of transparent materials such as glass, resin, and the fluid-driven substrate 110 may also be made of polyester compound, paper or other materials.

The width (the width in the first direction D1) of the flowing space 112 for liquid sample and the height (the height in the second direction D2) of the flowing space 112 for liquid sample may be set according to specific implementation demands. For example, the width and the height of the flowing space 112 for liquid sample may be in nanometer scale (for example, 1-100 nanometers).

In some embodiments of the present disclosure, the flowing space 112 for liquid sample may be formed on a silicon substrate, a glass substrate or a polymer substrate through photolithography or etching. For example, the polymer substrate may be made of PDMS (polydimethylsiloxane) or PMMA (polymethyl methacrylate).

For example, according to specific implementation demands, a hydrophobic membrane layer/hydrophilic membrane layer may be applied on an inner wall of the flowing space 112 for liquid sample, such that the liquid sample may flow or temporarily stay in the flowing space 112 for liquid sample according to detection demands. For example, Teflon-AF (amorphous fluoropolymer) can minimize the adhesion of the liquid sample on the inner wall of the flowing space 112 for liquid sample, such that the liquid sample can flow according to detection demands.

Figure 5B:
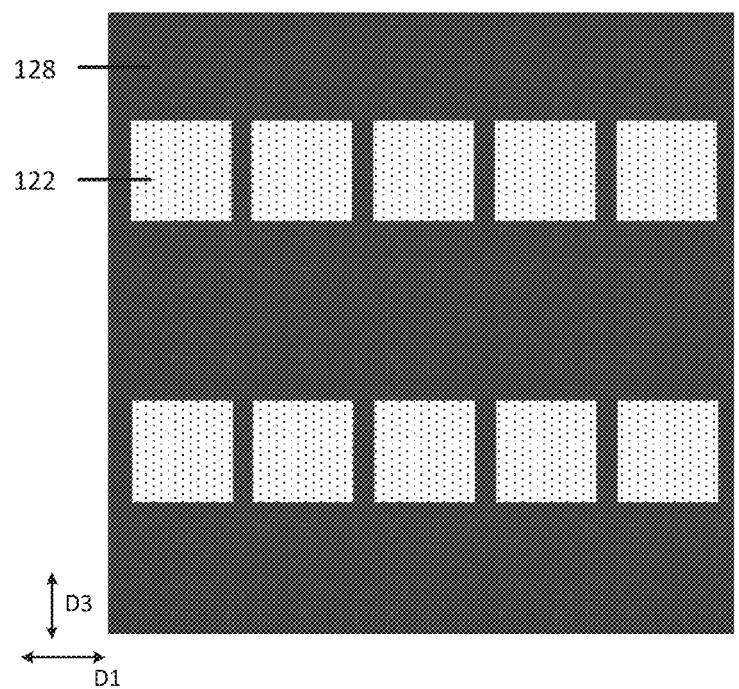
FIG. 5B is a plan view of a light-filtering structure and a light shielding pattern.

FIG. 5B illustrates a plan view of the light-filtering structure and the light shielding pattern 128 corresponding to FIG. 5A. As illustrated in FIG. 5B, the light shielding pattern 128 may comprise a light shielding region and a light transmission region, the light-filtering structure is in the light transmission region, and the light shielding region is configured to absorb or block the light that is emitted by the sub-light source 121 and incident on the light shielding region.

Figure 5C:
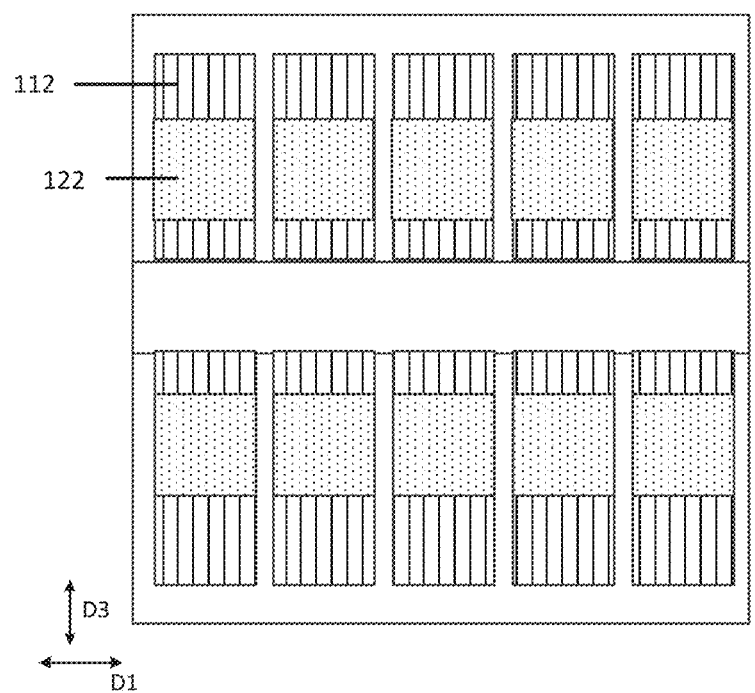
FIG. 5C is a plan view of a light-filtering structure and a fluid-driven substrate.
Figure 5D:
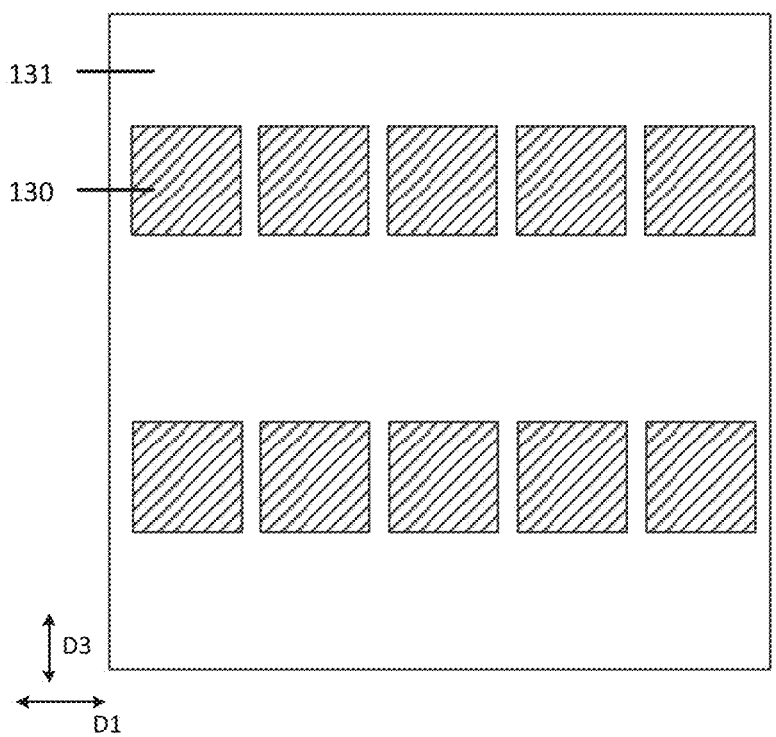
FIG. 5D is a plan view of a sensor and a sensor substrate.

FIG. 5C illustrates a plan view of the light-filtering structure and the fluid-driven substrate 110 corresponding to FIG. 5A. As illustrated in FIG. 5C, the sub-filter structures 122 and the sub-detection areas 111 of the fluid-driven substrate 110 are correspondingly arranged, that is, the sub-filter structures 122 and the sub-detection areas 111 are partially overlapped or completely overlapped in the direction perpendicular to the fluid-driven substrate 110. For example, the orthographic projection of each of the plurality of sub-filter structures 122 on the fluid-driven substrate overlaps (for example, completely overlaps) one corresponding sub-detection area 111.

For example, the flowing space 112 for liquid sample has a uniform width (see FIG. 5A) or a non-uniform width. In the case where the flowing space 112 for liquid sample has a non-uniform width, the width (i.e., the width of the sub-detection area 111) of the region, which is corresponding to the sub-filter structure 122, of the flowing space 112 for liquid sample may be greater than the width of other area of the flowing space 112 for liquid sample. Illustrative descriptions are given in the following with reference to FIG. 5A.

As illustrated in FIG. 5A, the flowing space 112 for liquid sample comprises the sub-detection area 111 and the other area outside of the sub-detection area 111 (for example, the area, which is at the upper side of the sub-detection area 111, of the flow passage and the area, which is at the lower side of the sub-detection area Ill, of the flow passage). Because the orthographic projection of the flowing space 112 for liquid sample on the plane (i.e., the paper surface in FIG. 5A) perpendicular to the second direction D2 is a rectangle, the width of the sub-detection area 111 in the first direction D1 is equal to the width of the other area of the flowing space 112 for liquid sample in the first direction D1. As illustrated in FIG. 5C, the width of the sub-filter structure 122 in the first direction D1 is equal to the width of the flowing space 112 for liquid sample in the first direction D1, but embodiments of the present disclosure are not limited to this case. For example, the width of the sub-detection area 111 in the first direction D1 may also be greater than the width of the other area of the flowing space 112 for liquid sample in the first direction D1, and the width of the sub-filter structure 122 in the first direction D1 is matched with (for example, the same as) the width of the sub-detection area 111 in the first direction D1.

As illustrated in FIG. 1A and FIG. 1B, the plurality of sensors 130 and the plurality of sub-detection areas 111 are corresponding arranged. For example, each of the plurality of sensors 130 and a corresponding sub-detection area 111 are partially overlapped or completely overlapped with each other in the direction perpendicular to the fluid-driven substrate 110, and each of the plurality of sensors 130 is configured to receive the light that is emitted by the sub-light source 121 and sequentially passes the sub-filter structure 122 and the sub-detection area 111, the plurality of sensors 130 respectively convert the light that is incident on the plurality of sensors 130 into electrical signals, and provide the electrical signals to a signal processing device. Because the optical signal received by the sensor 130 carries the information of the liquid sample, the signal processing device can obtain the information of the liquid sample through analyzing the electrical signal that is converted from the above-mentioned optical signal.

For example, the signal processing device may be implemented by hardware, software, firmware, or any combination. In some embodiments, the signal processing device may include a processor and a memory storing therein an executable program, and the executable program, when executed by the processor, can perform signal processing on an electrical signal received by the signal processing device, and can output information related to the liquid sample (for example, the substance contained in the liquid sample or/and the concentration of the substance contained in the liquid sample). In some embodiments, the signal processing device may include a database, and the database stores a corresponding relationship sheet between substance types and absorption wavelengths. The signal processing device compares the received electrical signal with reference data, and queries the corresponding relationship sheet so as to output an analysis result (for example, the substance contained in the liquid sample or/and the concentration of the substance contained in the liquid sample). For example, when detecting whether or not the sample to be measured is a first substance, the reference data may be the spectrum data of the first substance (for example, at least one of the absorption spectrum data and the emission spectrum data).

In some embodiments, the signal processing device may be a component of the fluid detection panel 100; in some embodiments, the signal processing device may be provided by the user voluntarily as desired. The signal processing device may be a handheld electronic device (for example, a mobile phone) or a computer. In some embodiments, the fluid detection panel 100 and the signal processing device may be connected in a wired or wireless manner.

In some embodiments, the optical sensor 130 may be selected from a PN type photodiode, a PIN junction type photodiode, a phototransistor, a sensor based on complementary metal oxide semiconductor (CMOS) and a sensor based on charge coupled device (CCD).

The distance between the sensor 130 and a corresponding sub-detection area 111 may be set according to the control accuracy of the propagation direction of the light that is leaving the sub-detection area 111, and the requirement on the signal-to-noise ratio of the sensor 130. For example, the sub-detection area 111 may be in contact with and joint closely with the surface of the sensor 130; a butter film layer may further be provided between the sub-detection area 111 and the sensor 130, so as to allow the sub-detection area 111 to be joint closely with the sensor 130.

In some embodiments, as illustrated in FIG. 1A, the sensor 130 and the circuit that is configured to drive a liquid droplets may be fabricated on the base of the fluid-driven substrate through semiconductor processes, that is, the sensor 130 is integrated and provided in the fluid-driven substrate 110, and is at the same side of the fluid-driven substrate 110 as the microflow passage, and the sensor 130 is corresponding to the sub-detection area 111.

In some embodiments, the sensor 130 and the microflow passage are respectively at surfaces of the fluid-driven substrate 110 at different sides. The sensor 130 may be provided on the surface of the fluid-driven substrate 110 through methods such as transfer printing, and the sensor 130 is corresponding to the sub-detection area 111. In some embodiments, as illustrated in FIG. 1B, the fluid detection panel 100 may further comprise a sensor substrate 131 at the side of the sensor 130 away from the optical unit 120, and the sensor 130 is in the sensor substrate 131. The sensor substrate 131 is connected with the fluid-driven substrate 110 through methods such as adhering. The material of the sensor substrate 131 comprises materials such as glass, silicon or plastic.

Figure 6:
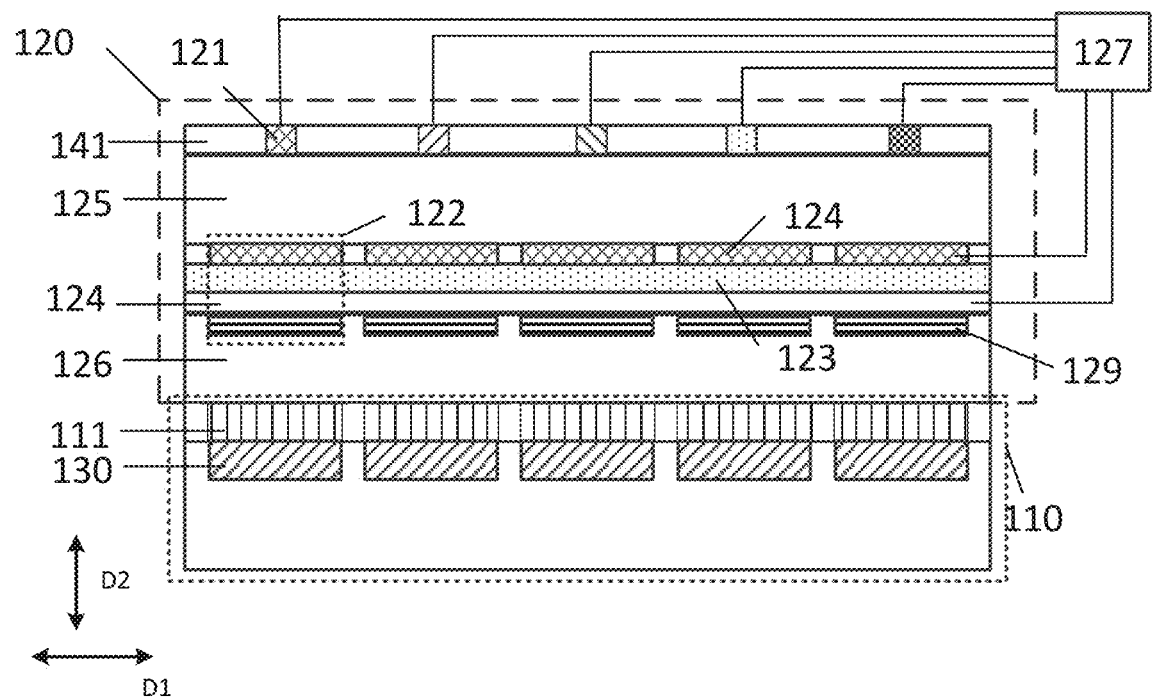
FIG. 6 is a cross-sectional view of another fluid detection panel provided by at least one embodiment of the present disclosure.

FIG. 6 illustrates a cross-sectional view of a fluid detection panel 100 provided by some other embodiments of the present disclosure, and the difference between the fluid detection panel 100 as illustrated in FIG. 6 and the fluid detection panel 100 as illustrated in FIG. 1A or FIG. 1B comprises at least one of the following two differences: firstly, the fluid detection panel 100 as illustrated in FIG. 6 lowers the cross talk caused by adjacent sub-light sources 121 through performing time sequence control on the plurality of sub-light sources 121; secondly, the fluid detection panel 100 may comprise a filter 129.

As illustrated in FIG. 6, the optical unit 120 comprises a plurality of sub-light sources 121 (for example, a first sub-light source, a second sub-light source, a third sub-light source, a fourth sub-light source and a fifth sub-light source which are sequentially arranged from the left side to the right side of FIG. 6) and a plurality of sub-filter structures 122 (for example, a first sub-filter structure, a second sub-filter structure, a third sub-filter structure, a fourth sub-filter structure and a fifth sub-filter structure which are sequentially arranged from the left side to the right side of FIG. 6). All of the plurality of sub-light sources 121 are electrically connected with the control device 127, so as to emit light under the control of the control device 127. The liquid crystal driving electrodes 124 of the first sub-filter structure, the second sub-filter structure, the third sub-filter structure, the fourth sub-filter structure and the fifth sub-filter structure are respectively and electrically connected with the control device 127, so as to respectively receive the driven voltage signal outputted by the control device 127. It should be noted that, for the sake of clarity, the control device 127 only connects with part of the liquid crystal driving electrodes 124 for illustration purpose.

As illustrated in FIG. 6, the fluid-driven substrate 110 may comprises a plurality of sub-detection areas 111 (for example, a first sub-detection area, a second sub-detection area, a third sub-detection area, a fourth sub-detection area and a fifth sub-detection area which are sequentially arranged from the left side to the right side of FIG. 6).

For example, the control device 127 may be configured to enable the first sub-light source, the second sub-light source, the third sub-light source, the fourth sub-light source and the fifth sub-light source to be sequentially in working state, such that the cross talk caused by adjacent sub-light sources 121 can also be avoided without providing the light shielding pattern between adjacent sub-light sources 121. For example, in the case where detection is performed with respect to the liquid sample in the second sub-detection area, only the second sub-light source is in working state, such that the adverse influence of the light emitted by the first sub-light source, the third sub-light source, the fourth sub-light source and the fifth sub-light source on the detection result of the liquid sample in the second sub-detection area can be avoided.

For example, the control device 127 may be configured to enable the first sub-filter structure, the second sub-filter structure, the third sub-filter structure, the fourth sub-filter structure and the fifth sub-filter structure to be in working state respectively when the first sub-light source, the second sub-light source, the third sub-light source, the fourth sub-light source and the fifth sub-light source are driven. In this case, a time synchronizer may be provided to enable the sub-filter structures to be synchronized with corresponding sub-light sources. For another example, the control device 127 may be configured to enable the first sub-filter structure, the second sub-filter structure, the third sub-filter structure, the fourth sub-filter structure and the fifth sub-filter structure to be in working state simultaneously. For example, in the case where detection is performed with respect to the liquid sample in the second sub-detection area, even though the first sub-filter structure and the third sub-filter structure are in working state, because the first sub-light source and the third sub-light source do not emit light, the first sub-light source, the third sub-light source, the first sub-filter structure and the third sub-filter structure cannot affects the detection result of the liquid sample in the second sub-detection area. It should be noted that, the control device 127 is not limited to sequentially drives the first sub-light source, the second sub-light source, the third sub-light source, the fourth sub-light source and the fifth sub-light source to sequentially emit light, the control device 127 may also be configured to enable adjacent sub-light sources 121 to emit light at different time. For example, the control device 127 may allow the first sub-light source, the third sub-light source and the fifth sub-light source to emit light at a first time point, and allow the second sub-light source and the fourth sub-light source to emit light at a second time point, such that the detection capability (the number of the liquid samples that can be simultaneously detected at a certain time point) of the fluid detection panel can be increased.

For example, in some embodiments, the optical unit 120 may further comprise a filter 129, and the filter 129 and a corresponding sub-filter structure 122 are stacked with each other, such that, in the case where the filtered light outputted by the sub-filter structure 122 comprises a plurality of spectrum peaks, one of the spectrum peaks in the plurality of spectrum peaks is allowed to enter the sub-detection area 111, and other spectrum peaks are filtered out. In some embodiments, as illustrated in FIG. 6, the filter may be between a sub-filter structure 122 and a corresponding sub-detection area 111. In some embodiments, the filter may be between a sub-filter structure 122 and a sub-light source 121, that is, the light emitted by the sub-light source 121 is firstly filtered by the filter, and then incident on the sub-filter structure 122.

In some embodiments, the filter 129 may be a cut-off filter such as a long pass filter (a filter that allows all light with the wavelength to be greater than the cut-off wavelength to pass through) or a short pass filter (a filter that allows all light with the wavelength to be smaller than the cut-off wavelength to pass through). In some embodiments, the filter 129 is a band pass filter. The filter 129 may comprise multi-layer optical films that are stacked with each other.

For example, for the spectrum distribution curve Cn2, as illustrated in FIG. 3B, of the light which passes the filter structure, in the case where only the spectrum peak with the peak wavelength of 475 nanometers is needed to perform detection on the sample to be measured, a long pass filter with the cut-off wavelength of 465 nanometers may be adopted to filter out the spectrum peak with the peak wavelength of 455 nanometers.

Figure 7:
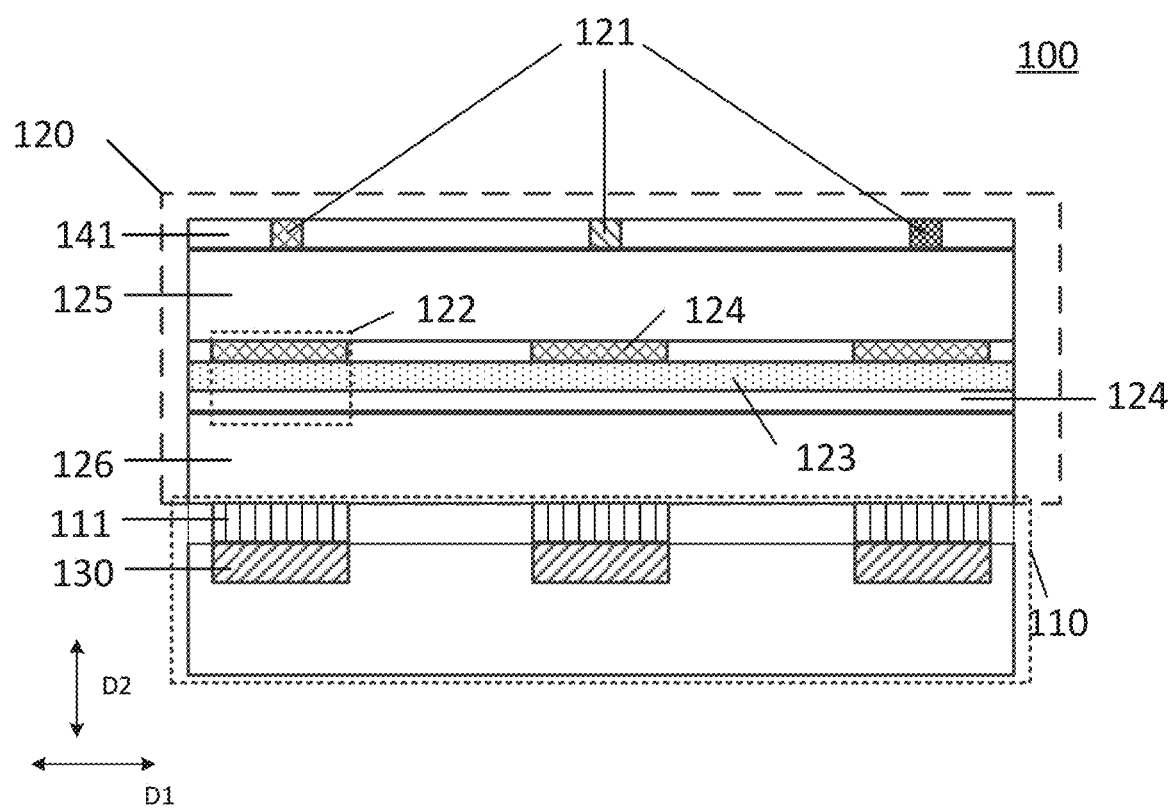
FIG. 7 is a cross-sectional view of further another fluid detection panel provided by at least one embodiment of the present disclosure.

FIG. 7 is a cross-sectional view of further another fluid detection panel 100 provided by at least one embodiments of the present disclosure, the difference between the fluid detection panel 100 as illustrated in FIG. 7 and the fluid detection panel 100 as illustrated in FIG. 1A or FIG. 1B is in that: the fluid detection panel 100 as illustrated in FIG. 7 lowers the cross talk caused by adjacent sub-light sources 121 through increasing the distance between adjacent sub-detection areas 111.

As illustrated in FIG. 7, the distance (the distance in the first direction D1) between adjacent sub-detection areas 111 is greater than the size (the size in the first direction D1) of each of the plurality of sub-detection areas 111, so as to minimize the cross talk. For example, the plurality of sub-filter structures 122 and the plurality of sub-detection areas 111 are corresponding arranged, so as to allow the light that is outputted from the sub-filter structures 122 to be able to illuminate the sub-detection areas 111, and therefore, the distance (the distance in the first direction D1) between adjacent sub-filter structures 122 is greater than the size (the size in the first direction D1) of each of the plurality of sub-detection areas 111.

It should be noted that, the distance between adjacent sub-detection areas 111 is not limited to be greater than the size of each of the plurality of sub-detection areas 111. For example, the distance between adjacent sub-detection areas 111 and the distance between adjacent sub-filter structures 122 may also be determined according to the distribution of the intensity of the sub-light source 121 at different exit angles of the light. For example, in the case where the sub-light source 121 is a Lambertian sub-light source 121, because 96% energy of the Lambertian light source is carried by the light with a divergence angle to be smaller than ±60°, most energy (for example, 95-99%, for example, 96.8%) of the Lambertian light source is carried by the light with a divergence angle to be smaller than ±80°, in this case, through setting the distance between adjacent sub-detection areas 111 (or adjacent sub-filter structures 122), the light with a divergence angle to be smaller than ±80° cannot enter adjacent sub-detection areas 111 (or adjacent sub-filter structures 122). In this case, the distance ds between adjacent sub-detection areas 111 (or adjacent sub-filter structures 122) satisfy the following expression:

$$ds = d + 2 \times w = 158 + 2 \times 17.64 = 193.28 \text{ micrometers},$$

where d is the distance between adjacent light shielding patterns 128 as illustrated in FIG. 1A or FIG. 1B, and w is the width of the light shielding patterns 128 as illustrated in FIG. 1A or FIG. 1B.

It should be noted that, even though the light shielding pattern 128 is provided between any two sub-filter structures 122 as illustrated in FIG. 1A, but embodiments of the present disclosure are not limited to this case, in some examples, as illustrated in FIG. 1A, the fluid detection panel may also comprise only one light shielding pattern 128 or comprise a plurality of light shielding pattern 128, in which the plurality of light shielding pattern 12 are respectively between part of adjacent sub-filter structures 122, and no further description will be given here.

Figure 8A:
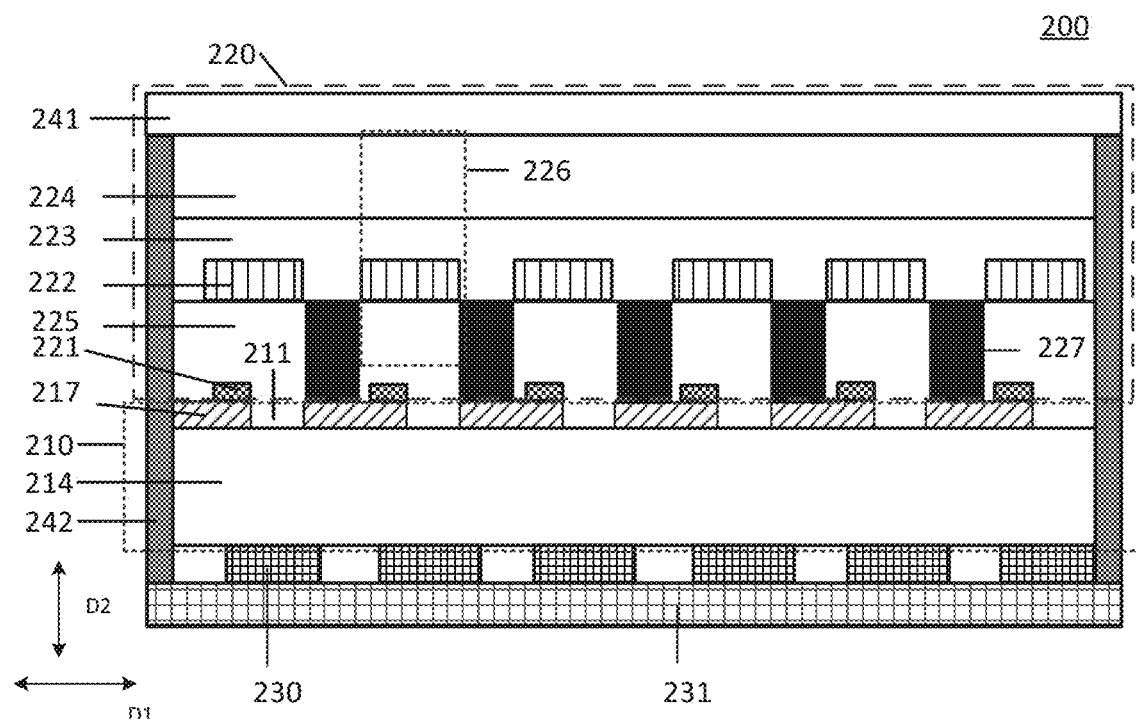
FIG. 8A is a cross-sectional view of still another fluid detection panel provided by at least one embodiment of the present disclosure.

In some embodiments of the present disclosure, as illustrated in FIG. 8A, the fluid detection panel 200 comprises a fluid-driven substrate 210, an optical unit 220 and a sensor 230. The fluid-driven substrate 210 comprises a detection area and is configured to enable the liquid sample to move to the sub-detection area 211 such that the liquid sample can be measured. For example, the detection area comprises a plurality of sub-detection areas 211, and each of the plurality of sub-detection areas 211 allows the liquid sample to flow through the each of the plurality of sub-detection areas 211. The optical unit 220 and the sensor 230 are on the fluid-driven substrate 210, in operation, the light emitted by the optical unit 220 illuminates on the sample on the fluid-driven substrate 210, and then the light is collected by the sensor 230, such that the detection function can be realized. For example, as illustrated in FIG. 8A, the sub-detection areas 211 are separated by, for example, spacers 217, to assist liquid to flow.

As illustrated in FIG. 8A, the optical unit 220 comprises a light source and a filter structure, and the light source is between the filter structure and the detection area. As illustrated in FIG. 8A, the light source comprises a plurality of sub-light sources 221, and the filter structure comprises a plurality of sub-filter structures 226. The sub-light sources 221 are at the side of the fluid-driven substrate 210 facing toward the sub-filter structure 226, and are opposite to the sub-filter structures 226. In some embodiments, the plurality of sub-light sources 221 may be respectively opposite to the plurality of sub-filter structures 226, so as to allow the filtered light to enter the sub-detection areas 211 via the spacings between adjacent sub-light sources 221. For example, the size of the sub-detection areas 211 can be increased through adopting laser chips or LED chips with a small size as the sub-light sources 221, that is, the size of the sub-light sources 221 in the first direction D1 is smaller than the size of the sub-filter structures 226 in the first direction D1. For example, the sub-light sources 221 may be implemented as collimated light sources.

In some embodiments, the sub-light sources 221 comprises a red laser source, a green laser source and a blue laser source, and the light emitted by the red laser source, the green laser source and the blue laser source (for example, blue laser chip) are mixed to form white light. The laser sources may be formed by semiconductor chips.

In some embodiments, the sub-light sources 221 may comprise light-emitting diodes with a relatively good collimation degree, that is, light-emitting diodes with a small divergence. In some embodiments, the sub-light sources 221 may comprise white light-emitting diodes; in some embodiments, the sub-light source 221 may comprise a red light-emitting diode, a green light-emitting diode and a blue light-emitting diode, and the light emitted by the red light-emitting diode, the green light-emitting diode and the blue light-emitting diode are mixed to form white light.

In some embodiments, the sub-filter structure 226 is configured for filtering (reflective type filtering) the light emitted by the sub-light source 221. As illustrated in FIG. 8A, the sub-filter structure 226 is configured to reflect at least part of the light that is emitted by the sub-light source 221 and within a pre-determined wavelength range, and transmit the light that is emitted by the sub-light source 221 and at the outside of the pre-determined wavelength range, such that filtering of the light emitted by the sub-light source 221 can be realized.

In some embodiments, at least one of the sub-filter structure (for example, one sub-filter structure or all of the sub-filter structures) comprises an optical waveguide structure, a first cladding, a second cladding and a grating. As illustrated in FIG. 8A, the period of at least one of the gratings 222 (for example, all of the gratings) is smaller than the wavelength of the light that is within the pre-determined wavelength range; the first cladding 225 and the second cladding 224 are at two sides of the optical waveguide structure 233, so as to allow light to be able to propagate in the optical waveguide structure 223 based on total reflection. The first cladding 225 is at the side of the optical waveguide structure 223 closer to the sub-light source 221, and the first cladding may be in direct contact with the optical waveguide structure 223. The grating 222 of the filter structure is at the surface of the optical waveguide structure 223 closer to the sub-light source 221. In some embodiments, the grating 222 may be in contact with the air between the sub-filter structure 226 and the fluid-driven substrate 210, that is, the first cladding 225 is the air. The optical waveguide structure 223 is configured to leak at least part of the light that enters the optical waveguide structure 223 and is within the pre-determined wavelength range, and allow the light that is leaked to interfere with the light that is reflected by the grating 222 and within the pre-determined wavelength range, so as to enhance the light that is reflected by the grating 222 and within the pre-determined wavelength range.

The optical waveguide structure 223 has a relatively high transmittance (for example, 90%) for the light that is within the pre-determined wavelength range; the refractive index of the optical waveguide structure 223 is greater than the refractive index of the first cladding 225 and the refractive index of the second cladding 224. In some embodiments, the optical waveguide structure 223 may be made of transparent resin; the optical waveguide structure 223 may also be made of silicon nitride (SiNx) with the refractive index of 1.7-1.9. In some embodiments, the optical waveguide structure 223 may be implemented as a thin film. The thickness of (the thickness in the second direction D2) the optical waveguide structure 223 may be set according to specific implementation demands, and no specific limitation will be given here.

It should be noted that, the first cladding 225 may also be a transparent material, such as a transparent organic resin material or a silicon dioxide material. The thickness of the first cladding 225 may be determined by specific product designs or process conditions, and may be 0.1 millimeters. For example, in the case where the first cladding is air, it not necessary to take the planeness of the surface of the first cladding away from the sub-filter structure 226 and the planeness of the interface between the first cladding and the sub-filter structure 226 into consideration.

For example, the second cladding 224 be a glass substrate, a quartz substrate, a plastic substrate (for example polyethylene terephthalate (PET) substrate) or other substrates made of suitable material. For example, the second cladding 224 may adopt a substrate that suitable for liquid crystal display device or an organic light-emitting diode display device, or customized optical glass, resin material or the like. For example, the thickness and the refractive index of the second cladding 224 may be determined by specific product designs or process conditions, the thickness of the second cladding 224 is, for example, 0.3 millimeters, and the refractive index of the second cladding 224 is, for example, 1.46. For example, the surface, which is in contact with the optical waveguide structure 223, of the second cladding 224, may have good planeness and parallelism.

Figure 9:
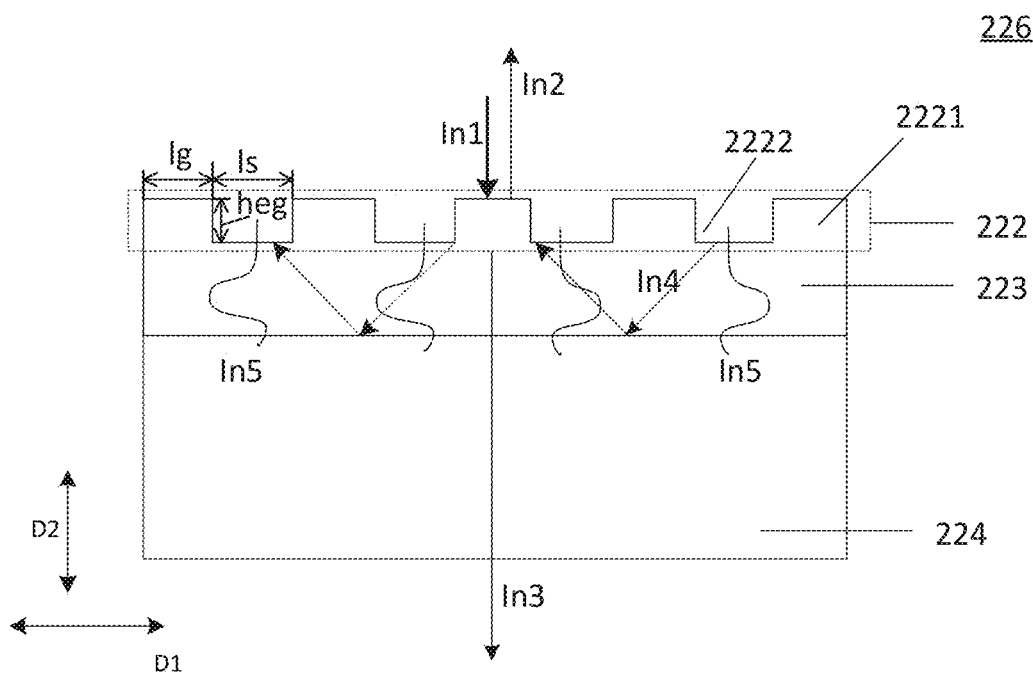
FIG. 9 is a cross-sectional view of a filter structure of the fluid detection panel as illustrated in FIG. 8B.

FIG. 9 illustrates a cross-sectional view of a partial region of the grating 222, the optical waveguide structure 223 and the second cladding 224 (i.e., a cross-sectional view of the sub-filter structure 226). As illustrated in FIG. 9, the grating 222 comprises grooves 2222 which are arranged in the first direction D1 and are spaced apart. Grating lines 2221 are formed between adjacent grooves 2222. The duty cycle of the grating 222 is about 0.5-0.75. In the case where the size of the grooves 2222 in the first direction D is a fixed value, the size of each of the grating lines 2221 in the first direction D1 has a positive correlation with the duty cycle of the grating 222. In some embodiments, the duty cycle of the grating 222 may adopt other suitable value, so as to adjust the intensity of the light outputted by the grating 222, such that the intensity of the light outputted by different gratings 222 can be matched (for example, the same) with each other in the case where the optical unit 220 comprises the plurality of gratings 222. The duty cycle A of the grating 222 satisfies the following expression: $\Lambda=lg/ls$, here, lg is the size of the grating lines 2221 in the first direction D1, ls is the size of the grooves 2222 between adjacent two grating lines 2221 in the first direction D1.

The material of the grating 222 may be a transparent material; the refractive index of the material of the grating 222 is greater than the refractive index of the first cladding and the refractive index of the second cladding 224. The height of the grating lines 2221 may be set according to the wavelength of the outputted light. For example, the depth heg of the grooves 2222 may range from 50 nanometers to 500 nanometers. For example, the depth heg of the grooves 2222 may be 70 nanometers or 100 nanometers. When determining the depth of the grooves 2222, the optical binding capability of the optical waveguide structure 223 may be taken into consideration. The weaker the optical binding capability of the optical waveguide structure 223, the easier for the light that is propagate in the optical waveguide structure 223 to leak from the optical waveguide structure 223. For example, the optical binding capability of the optical waveguide structure 223 is relevant to the difference between the waveguide mode and the difference between the refractive index of the optical waveguide structure 223 and the refractive index of the medium around the optical waveguide structure 223.

As illustrated in FIG. 8A, the plurality of gratings 222 of the plurality of sub-filter structures 226 are respectively opposite to the plurality of sub-detection areas 211, such that the light reflected by the plurality of gratings 222 can be incident onto corresponding sensors 230 via corresponding sub-detection areas 211. For example, the orthographic projection of each of the plurality of sub-filter structures 226 on the fluid-driven substrate overlaps (for example, completely overlaps) one corresponding sub-detection area 211.

In some embodiments, at least two of the plurality of gratings 222 has different parameters. For example, the periods of the at least two of the plurality of gratings 222 are different.

In some embodiments, the plurality of gratings 222 are configured to reflect the beams of light that are emitted by the sub-light sources 221 and within different wavelength ranges, such that the optical unit 220 can provide the beams of light that have a narrow full width at half maximum and are within different wavelength ranges. Therefore, the fluid detection panel 200 including the optical unit 220 can be configured to detect the material compositions of the samples simultaneously or at different times. In some embodiments, the periods of the plurality of gratings 222 are different with each other, such that the plurality of gratings 222 can reflect the beams of light that are emitted by the sub-light sources 221 and within different wavelength ranges. In an example, the spectrums of the light emitted by the sub-light sources 221 may be the same, the beams of light that are obtained through reflecting the light emitted by the sub-light sources 221 with different gratings 222 are within different wavelength ranges.

In some embodiments, in the case where the optical unit 220 comprises the plurality of sub-filter structures 226, the optical waveguide structures 223 of the plurality of sub-filter structures 226 can be an integrated structure, that is, there is no interface between the optical waveguide structures 223 of adjacent sub-filter structures 226; the first claddings 225 of the plurality of sub-filter structures 226 can be an integrated structure, that is, there is no interface between the first claddings 225 of adjacent sub-filter structures 226.

In some embodiments, the optical unit 220 may comprise only one sub-filter structure 226; or, the optical unit 220 comprises a plurality of sub-filter structures 226 which are configured to reflect the beams of light that are emitted by the sub-light source 221 and are within the same wavelength range, that is, the plurality of sub-filter structures 226 have the same structure parameters.

Figure 8B:
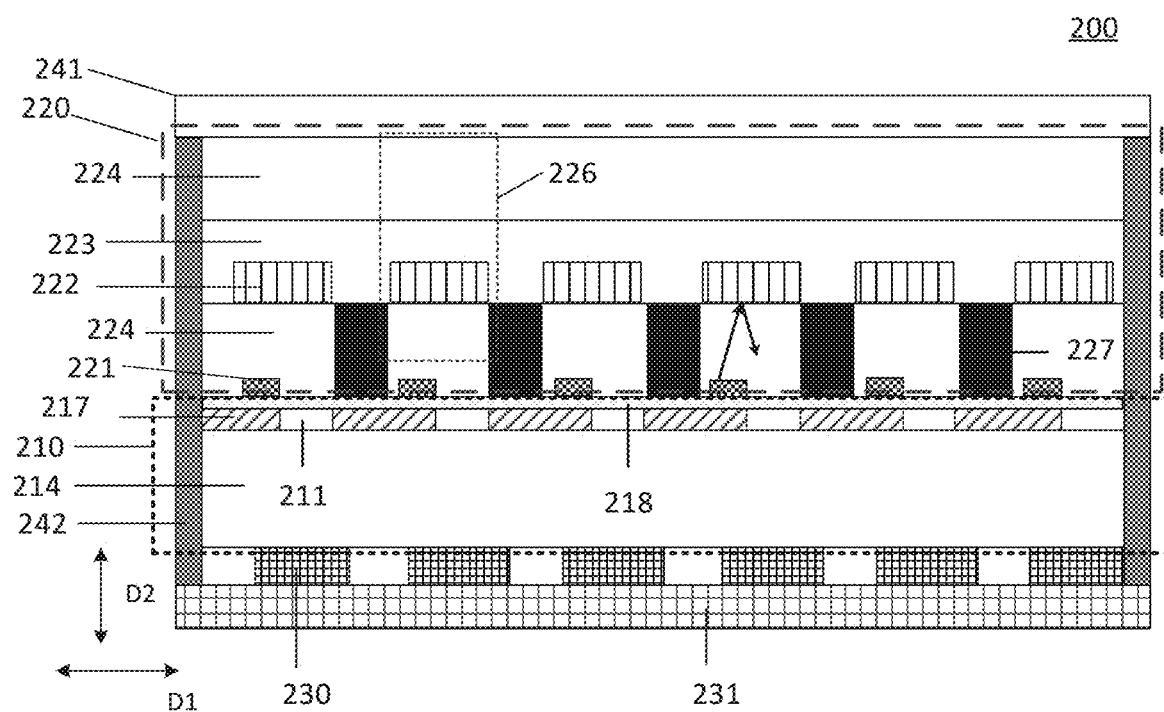
FIG. 8B is a cross-sectional view of still another fluid detection panel provided by at least one embodiment of the present disclosure.

In some embodiments, the fluid detection panel 200 further comprises a packing film 218, as illustrated in FIG. 8B, the packing film 218 is at the surface of the fluid-driven substrate 210 away from the sensor 230, and the packing film 218 is configured to separate the liquid sample in the liquid flow passage from the optical unit 220, such that adverse impact of the liquid sample in the liquid flow passage on, for example, the gratings 222 in the optical unit 220 can be avoided.

The refractive index of the packing film 218 is close to the refractive index of the material for forming the flowing space 212 for liquid. In some embodiments, the packing film 218 has a large transmittance for the light that is within the pre-determined wavelength range, and the transmittance may be greater than 90%. For example, the scattering of the light that is within the pre-determined wavelength range by the packing film 218 is relatively small. For example, through providing the packing film 218, the requirements of the fluid detection panel 200 on the size and the surface tension of the liquid sample are, for example, reduced. The fluid detection panel 200 as illustrated in FIG. 8B can be used for detecting the sample with a relatively small surface tension, and the flowing space 212 for liquid can fill with the sample with a relatively small surface tension, such that the application range of the fluid detection panel 200 can be widened. For example, the sub-light source 221 as illustrated in FIG. 8B can be aligned with the grating 222 and the flowing space 212 for liquid as illustrated in FIG. 8B, such that the detection effect can be further improved. In other examples of the present disclosure, according to specific implementation demands, the grating can be aligned with the flowing space for liquid, and no further description will be given here.

As illustrated in FIG. 8A and FIG. 8B, the fluid-driven substrate 210 comprises the plurality of sub-detection areas 211; the plurality of sensors 230 are on the fluid-driven substrate 210, such that the plurality of sensors 230 and the sub-detection areas 211 are corresponding arranged, and the plurality of sensors 230 are respectively configured to receive the beams of light that are emitted by the sub-light source 221, and each one of the beams of light sequentially passes the sub-filter structure 226 and the sub-detection area 211.

As illustrated in FIG. 8A and FIG. 8B, in some embodiments, the optical unit 220 further comprises a first light shielding structure 227, the first light shielding structure 227 is between the fluid-driven substrate 210 and the optical waveguide structure 223, and the orthographic projection of the first light shielding structure 227 on the optical waveguide structure 223 is not overlapped with the grating 222. For example, the distance between adjacent first light shielding structures 227 may be set according to the distance between adjacent gratings 222.

The first light shielding structure 227 is configured to shield the light that is outputted by the sub-filter structure 226 and at the outside of the pre-determined wavelength range, and further configured to block stray light that is caused by reasons such as a rough interface (for example, the interface between the optical waveguide structure 223 and the grating lines 2221), such that the interference on adjacent sub-detection areas 211 can be reduced and the detection accuracy of the fluid detection panel 200 can be improved. As illustrated in FIG. 8A, the interference of the light reflected by the leftmost sub-filter structure 226 in FIG. 8A on the second sub-detection area 211 from left can be reduced.

As illustrated in FIG. 8A and FIG. 8B, in some embodiments, the optical unit 220 further comprises a second light shielding structure 241, and the second light shielding structure 241 is at the side of the optical waveguide structure 223 away from the sub-light source 221. For example, the second light shielding structure 241 may completely overlaps the surface of the second cladding 224 away from the optical waveguide structure 223. The second light shielding structure 241 may be made of dark organic resin, and is configured to absorb the light (for example, ln3 in FIG. 9) that passes the grating 222, the optical waveguide structure 223 and the second cladding 224. The second light shielding structure 241 is further configured to block ambient light. As illustrated in FIG. 8A and FIG. 8B, the fluid detection panel 200 may further comprise a sealing structure 242 (for example, a sealant), and the sealing structure 242 and the second light shielding structure 241 are configured to isolate ambient light.

As illustrated in FIG. 8A and FIG. 8B, the sensor 230 is at the side of the sub-detection area 211 away from the sub-filter structure 226 and is configured to receive the light that is emitted by the sub-light source 221 and sequentially passes the sub-filter structure 226 and the sub-detection area 211, and the sensor 230 converts the light that is incident onto the sensor 230 into an electrical signal and provides the electrical signal to the a signal processing device (not illustrated in figures). Because the filtered light carries the information of the liquid sample, and the electrical signal received by the signal processing device also carries the information of the liquid sample, such that the signal processing device can obtain the information of the liquid sample through signal processing.

For example, the signal processing device may be implemented by hardware, software, firmware, or any combination. In some embodiments, the signal processing device may include a processor and a memory storing therein an executable program, and the executable program, when executed by the processor, can perform signal processing on an electrical signal received by the signal processing device, and can output information related to the liquid sample (for example, the substance contained in the liquid sample or/and the concentration of the substance contained in the liquid sample). In some embodiments, the signal processing device may include a database, and the database stores a corresponding relationship sheet between substance types and absorption wavelengths. The signal processing device compares the received electrical signal with reference data, and queries the corresponding relationship sheet so as to output an analysis result (for example, the substance contained in the liquid sample or/and the concentration of the substance contained in the liquid sample).

In some embodiments, the signal processing device may be a component of the fluid detection panel 200; in some embodiments, the signal processing device may be provided by the user voluntarily as desired, the signal processing device may be a handheld electronic device (for example, a mobile phone) or a computer. In some embodiments, the fluid detection panel 100 and the signal processing device may be connected in a wired or wireless manner.

In some embodiments, the optical sensor 230 may be selected from a PN type photodiode, a PIN junction type photodiode, a phototransistor, a sensor based on complementary metal oxide semiconductor (CMOS) and a sensor based on charge coupled device (CCD).

For example, the distance between the sensor 230 and a corresponding sub-detection area 211 may be set according to the accuracy of the propagation direction of the light that is leaving the sub-detection area 211, and the requirement on the signal-to-noise ratio of the sensor 230. For example, the sub-detection area 211 may be in contact with and joint closely with the surface of the sensor 230; a butter film layer may further be provided between the sub-detection area 211 and the sensor 230, so as to allow the sub-detection area 211 to be joint closely with the sensor 230.

For example, the fluid detection panel 200 may further comprise a sensor substrate 231 at the side of the sensor 230 away from the optical unit 220, the sensor 230 is on the sensor substrate 231. The sensor substrate 231, for example, may be a glass substrate or a semiconductor substrate. For example, the sensor substrate 231 may be an opaque substrate 214, such that it can avoid the ambient light from illuminating on the interface between the flowing space 212 for liquid and the transparent substrate 214 through the sensor substrate 231 and the spacing between adjacent sensors 230. Therefore, it can avoid the interface between the flowing space 212 for liquid and the transparent substrate 214 to reflect the ambient light on the sensor 230, such that the detection accuracy of the fluid detection panel 200 can be improved.

It should be understood that, for the embodiment as illustrated in FIG. 8A and FIG. 8B, the sensor 230 may be integrated in the fluid-driven substrate 210 and it is not necessary to provide the sensor substrate 231 that is separated from the fluid-driven substrate 210, and no limitation will be given in embodiments of the present disclosure in this respect.

The filtering principle of the sub-filter structure 226 as illustrated in FIG. 8A and FIG. 8B are illustratively described in the following with reference to FIG. 9 and FIG. 10A-FIG. 10D.

As illustrated in FIG. 9, when the light ln1 emitted by the sub-light source 221 is incident on the grating 222, part of light (ln2) is reflected; another part of light (ln4) passes the grating 222, and enters the optical waveguide structure 223. Most of light that enters the optical waveguide structure 223 propagates in the optical waveguide structure 223 by way of total reflection, so as to form a guided mode ln5; part (for example, a small part) of light (ln3) can pass and leave the optical waveguide structure 223 and the second cladding 224.

For example, the light ln1 emitted by the sub-light source 221 as illustrated in FIG. 9 may be a collimated light. It should be noted that, for the sake of clarity, the light ln1 emitted by the sub-light source 221 as illustrated in FIG. 9 is incident on the grating 222 perpendicularly, but embodiments of the present disclosure are not limited to this case. For example, the light ln1 emitted by the sub-light source 221 as illustrated in FIG. 9 may also be incident on the grating 222 obliquely, so as to allow part of light (ln4) to be able to pass the grating 222 and enter the optical waveguide structure 223, and to allow the light that enters the optical waveguide structure 223 to be able to propagate in the optical waveguide structure 223 according to total reflection.

For example, the optical waveguide structure 223 is a weak binding optical waveguide, and therefore, the binding capability of the optical waveguide structure 223 for the light that is propagated in the optical waveguide structure 223 is relatively weak. This enables part of light (the light that is within the pre-determined wavelength range) that is propagated in the optical waveguide structure 223 to leak to the side of the optical waveguide structure 223 closer to the grating 222 from the optical waveguide structure 223, and the light that is leaked (the light that is within the pre-determined wavelength range) interferes with the light ln2 that is reflected by the grating 222 and within the pre-determined wavelength range, such that the light that is reflected by the grating 222 and within the pre-determined wavelength range can be enhanced, such that the filter function of the sub-filter structure 226 can be realized.

In embodiments of the present disclosure, the grating 222 as illustrated in FIG. 9 is different from conventional diffraction gratings, and therefore, the filter function of the sub-filter structure 226 including the grating 222 as illustrated in FIG. 9 cannot be interpreted by ordinary diffraction grating theory. The filter function of the sub-filter structure 226 including the grating 222 as illustrated in FIG. 9 is illustratively described in the following from the perspective of physical optics.

In the case where the period (that is, lg+ls) of the grating 222 is smaller than the wavelength of the light that is incident into the grating 222, only zero-order diffraction light is outputted after the light is incident into the grating 222, and no diffraction light with other orders is outputted (i.e., no dispersion is generated by the grating 222 with respect to the incident light). According to an effective refractive index, the weak modulated grating 222 can be equivalent to a planar waveguide, when the parameters of a high-order propagation wave propagated in the planar waveguide is similar to the guided mode supported by the optical waveguide structure 223, the energy of the optical wave in the optical waveguide structure 223 can be re-distributed. The periodic modulation characteristics of the grating 222 enables part of light in the optical waveguide structure 223 to leak out of the optical waveguide structure 223, and therefore, the energy of leaky wave (leaky mode) leaked from the optical waveguide structure 223 can be re-distributed, such that guide mode resonation can be formed. Therefore, the filter function can be realized by using high diffraction efficiency and narrow band characteristics of the guide mode resonation.

The software (FDTD Solution) for performing calculation of a finite difference time domain method is adopted to establish a model for the filter structure based on the following structures, in which the optical waveguide structure 223 is a silicon nitride (SiNx) with the refractive index of 1.73, the first cladding is an optical glass with the refractive index of 1.46; the second cladding 224 is the air medium with the refractive index of 1; the light emitted by the sub-light source 221 is white light, and the wavelength of the above-mentioned white light ranges from 380 nanometers to 780 nanometers; the period of the grating 222 is 335 nanometers, the height (the height in the second direction D2) of the grating lines 2221 is 70 nanometers, the duty cycle of the grating 222 is 50%, and the width of the grating lines 2221 is 167.5 nanometers. The simulation results are illustrated in FIG. 10A-FIG. 10D. It should be noted that, and the unit of longitudinal axes of FIG. 10A-FIG. 10D are arbitrary units.

Figure 10A:
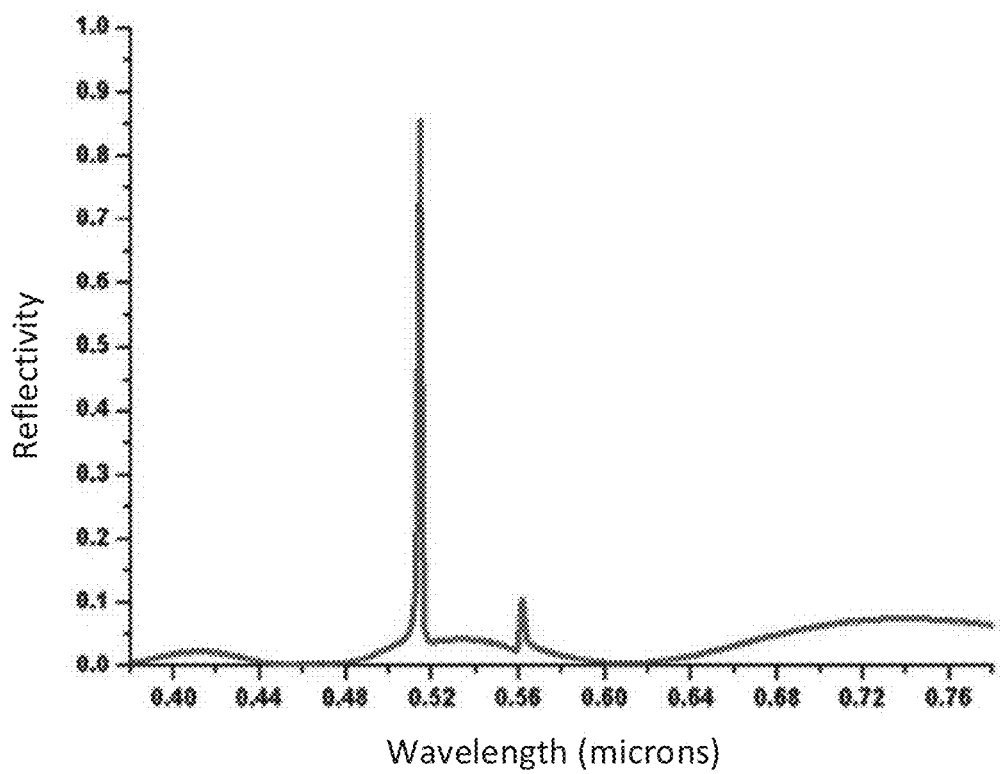
FIG. 10A is a wavelength distribution of light reflected by a filter structure.

FIG. 10A illustrates the wavelength distribution (i.e., the reflection spectrum of the sub-filter structure 226 for the white light that is incident on the sub-filter structure 226) of the reflected light outputted from the light-incident side of the sub-filter structure 226, under the reflective resonance of the sub-filter structure 226, the reflective intensity (i.e., reflectivity) of the sub-filter structure 226 for light with the wavelength of 516 nanometers is largest (about 90%), that is, the peak wavelength of the reflection peak of the sub-filter structure 226 is 516 nanometers. As illustrated in FIG. 10A, the full width at half maximum (FWHM) of the reflection peak with the peak wavelength of 516 nanometers is about 2 nanometers, the reflective intensity (i.e., reflectivity) of the sub-filter structure 226 for other wavelength, which is at the outside of the reflection peak (the peak wavelength is of 516 nanometers), of the white light, is substantially smaller than 10%. Because the period (335 nanometers) of the grating 222 is smaller than the wavelength (516 nanometers) of the reflection peak, the narrow band filtering characteristics of the sub-filter structure 226 is caused by the leaky mode due to the guide mode resonation.

Figure 10B:
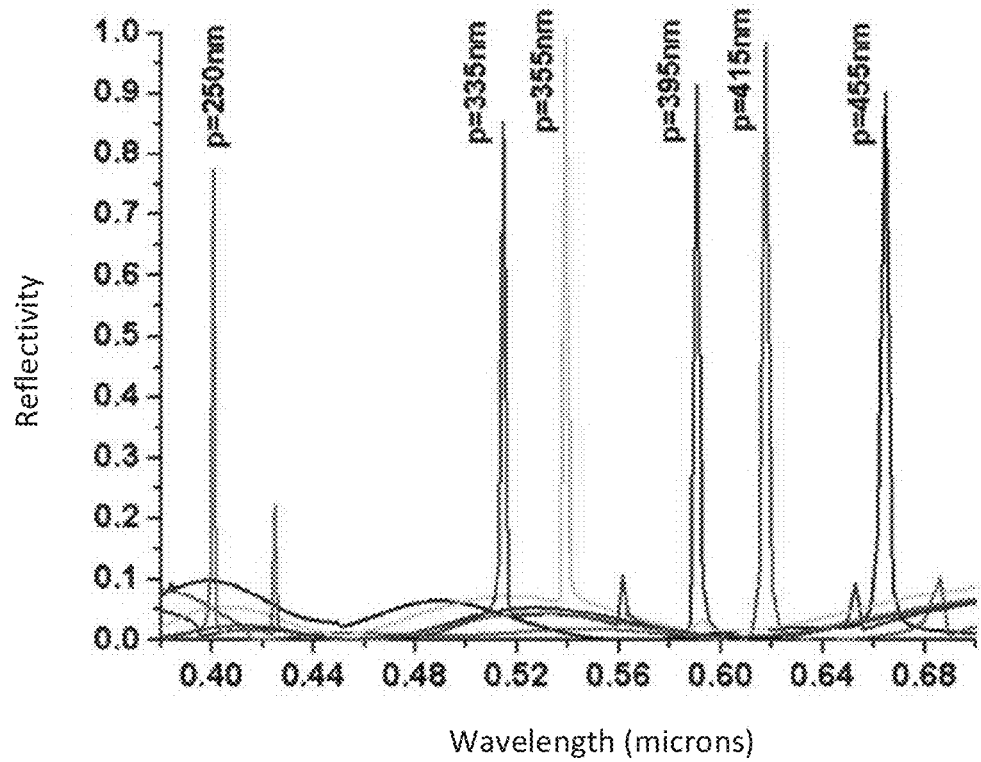
FIG. 10B illustrates a wavelength distribution of light reflected by a filter structure at different grating period values.

FIG. 10B illustrates the wavelength distribution of the light reflected by the sub-filter structure 226 when the period of the grating 222 adopts different values. As illustrated in FIG. 10B, the wavelength of the reflection peak of the sub-filter structure 226 is increased along an increase of the period p of the grating 222 when the period p of the grating 222 is in the range of 250 nanometers-455 nanometers, and therefore, the wavelength of the reflection peak of the filtered light can be adjusted by adjusting the period p of the grating 222.

For example, as illustrated in FIG. 10B, in the case where the period p of the grating 222 is equal to 250 nanometers, after the reflective resonance of the sub-filter structure 226, the reflection peak of the sub-filter structure 226 is at 400 nanometers; in the case where the period p of the grating 222 is equal to 455 nanometers, after the reflective resonance of the sub-filter structure 226 the reflection peak of the sub-filter structure 226 is at 670 nanometers. As illustrated in FIG. 10B, for the cases where the period p of the grating 222 adopts different values, all the full width at half maximum of the reflection peaks of the sub-filter structure 226 are of about 2 nanometers. Therefore, the full width at half maximum of the filtered light outputted by the sub-filter structure 226 provided by FIG. 8A is relatively narrow, this is in favor of increasing the detection accuracy of the fluid detection panel 200 including the sub-filter structure 226. For example, as illustrated in FIG. 10B, through optimizing the depth of and the duty cycle of the grooves, the light intensity of all the reflection peaks reflected by the sub-filter structure 226 can be equal to or larger than 80%, such that the power consumption of the fluid detection panel 200 including the sub-filter structure 226 can be reduced.

Figure 10C:
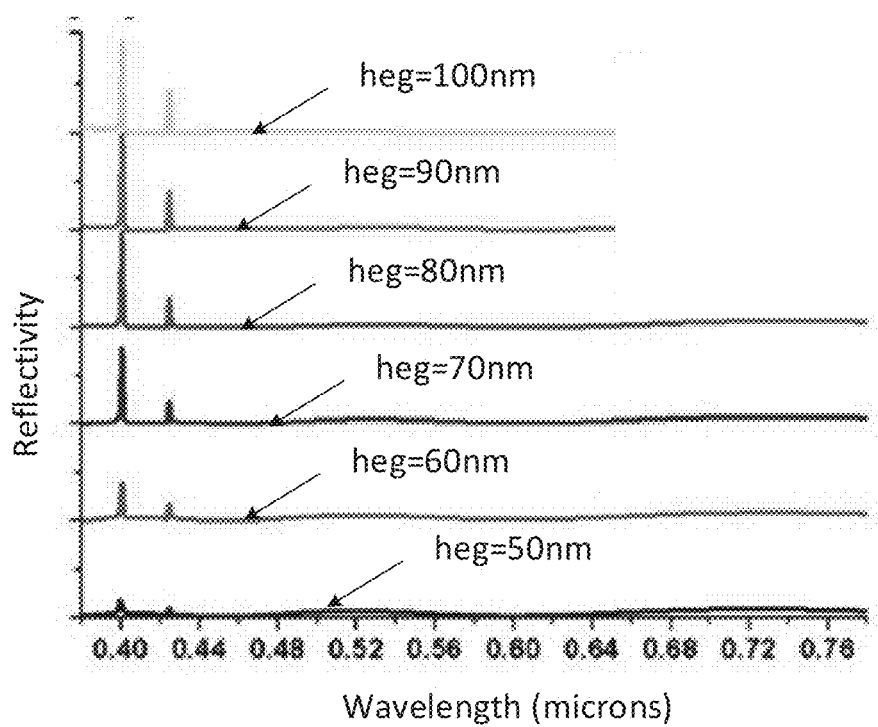
FIG. 10C illustrates a wavelength distribution of light reflected by a filter structure at different height values of a grating line.

FIG. 10C illustrates the wavelength distribution of the light reflected by the sub-filter structure 226 for the case where the period of the grating 222 is 250 nanometers, and the depth heg of the grooves in the second direction D2 adopts different values (the illustrative range is 50 nanometers-100 nanometers, the step size is 10 nanometers). As illustrated in FIG. 10C, when the depth of the grooves is changed, the wavelengths of the reflection peaks of the sub-filter structure 226 are all at 400 nanometers, that is, the wavelength of the reflection peak of the sub-filter structure 226 is not changed, but the intensity of the reflection peak of the sub-filter structure 226 is changed apparently. As illustrated in FIG. 10C, in the case where the depth of the grooves is 90 nanometers, the intensity of the reflection peak of the sub-filter structure 226 is largest (is about 98%). Therefore, the intensity of the reflection peak of the sub-filter structure 226 can be optimized through adjusting the height of the grating lines 2221. It should be noted that, for the sake of clarity, for the cases where the depth of the grooves is equal to 100 nanometers and the depth of the grooves is equal to 90 nanometers, the reflectivity distribution in only part wavelength range is illustrated for the light reflected by the sub-filter structure 226.

Figure 10D:
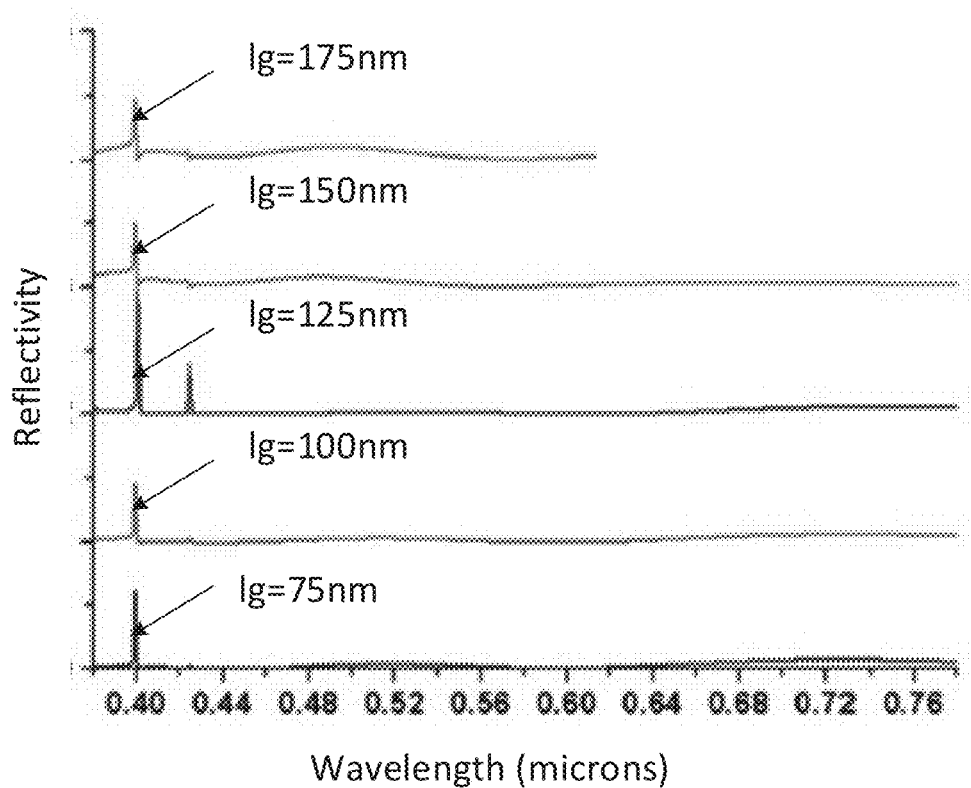
FIG. 10D illustrates a wavelength distribution of light reflected by a filter structure at different width values of a grating line.

FIG. 10D illustrates the wavelength distribution of the light reflected by the sub-filter structure 226 for the cases where the duty cycle of the grating adopts different values, for example, the values of the widths lg of the grating line 2221 in the first direction D1 are respectively 75 nanometers, 100 nanometers, 125 nanometers, 150 nanometers, 175 nanometers, and the value of the size Is of the groove 2222 in the first direction D1 is a fixed value. When the width of the grating lines 2221 is changed in the range of 75 nanometers-175 nanometers, the wavelengths of the reflection peaks of the sub-filter structure 226 are all at 400 nanometers, however, the intensity of the reflection peak of the sub-filter structure 226 is apparently changed. It should be noted that, for the sake of clarity, for the case where the width lg of the grating lines 2221 is equal to 175 nanometers, the reflectivity distribution in only part wavelength range is illustrated for the light reflected by the sub-filter structure 226.

In the actual manufacturing process, the period of the grating 222 at one side of the optical waveguide structure 223 is smaller than the half of the peak wavelength of the reflection peak reflected by the sub-filter structure 226. Because the peak wavelength of the reflection peak reflected by the sub-filter structure 226 is only hundreds of nanometers, and therefore, the period of the grating 222 is relatively small, controlling of the period of the grating 222 is relatively difficult. The controlling of the etching depth or the width of the grating lines in manufacturing process is more difficult that controlling of the period of the grating 222, however, according to the above-mentioned simulation result under the premise of the period of the grating 222 being a fixed value, the filter function can be substantially realized in the case where the etching depth of the grating 222 is in the range of the optimized value (or the set value)±20 nanometers; the filter function of the sub-filter structure 226 can be realized in the case where the width of the grating lines 2221 is in the range of the optimized value (or the set value)±25 nanometers, and therefore, the sub-filter structure 226 provided by embodiments of the present disclosure has a relatively low requirement on the manufacturing accuracy, and has a relatively high tolerance on the manufacturing error, such that the sub-filter structure 226 provided by embodiments of the present disclosure is suitable for mass production.

Figure 11A:
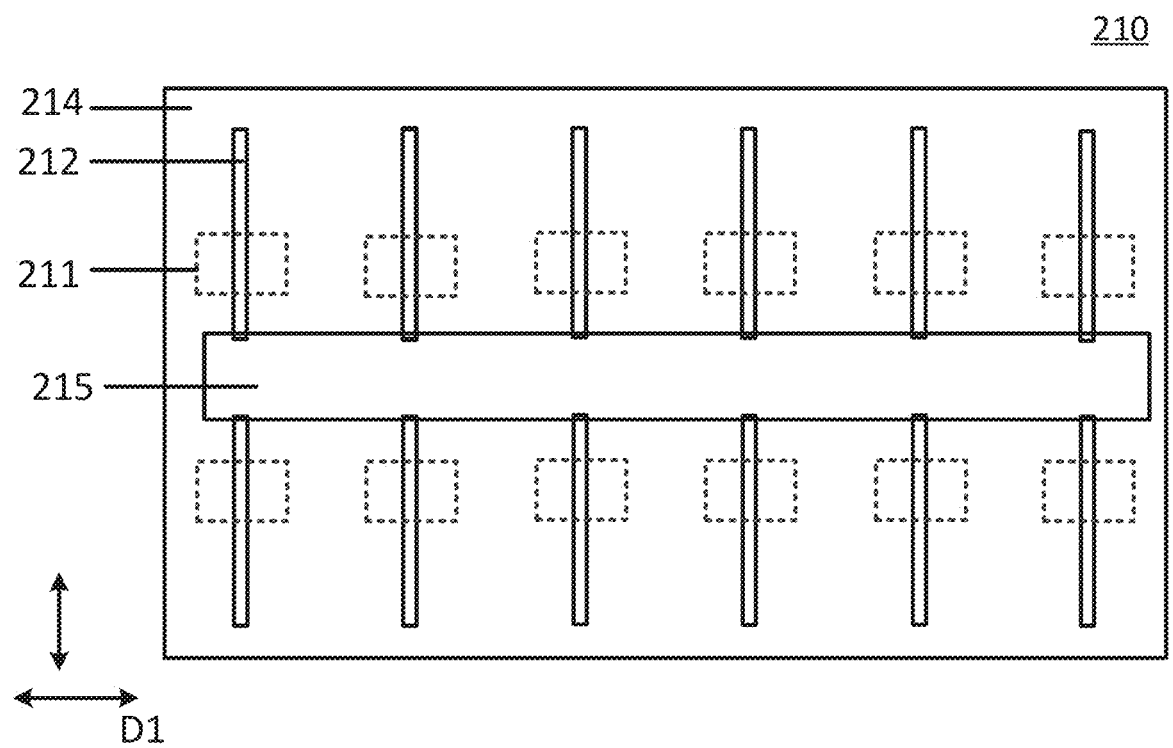
FIG. 11A is a plan view of a fluid-driven substrate provided by at least one embodiment of the present disclosure.

FIG. 11A illustrates a plan view of the fluid-driven substrate 210 as illustrated in FIG. 11A provided by some embodiments of the present disclosure, the fluid-driven substrate 210 comprises a transparent substrate 214, and a flowing space 212 for liquid sample (for example, the microflow passage) and a liquid tank 215, which are on the transparent substrate 214. The terminal end of the flowing space 212 for liquid sample connects the liquid tank 215, and therefore, the liquid sample after detection can flow into the liquid tank 215 for temporary storage.

The area, which is corresponding to the sub-filter structure 226, of the flowing space 212 for liquid sample is referred to as the sub-detection area 211 of the fluid-driven substrate 210. In operation, the liquid sample enters the flowing space 212 for liquid sample from the initial end of the flowing space 212 for liquid sample, and then the liquid sample flows into the sub-detection area 211 and is detected, lastly, the liquid sample flows into the liquid tank 215 via the terminal end of the flowing space 212 for liquid sample. The fluid-driven substrate 210 comprises a plurality of driving electrodes, and the plurality of driving electrodes are configured to be able to drive the liquid sample to move to the sub-detection area 211, such that the liquid sample can be detected. The flowing space 212 for liquid sample can be formed through performing grooving or imprinting on the transparent substrate 214.

The material of and the thickness of the fluid-driven substrate 210 as illustrated in FIG. 11A may be set according to specific implementation demands, and no specific limitation will be given in embodiments of the present disclosure in this respect. For example, the fluid-driven substrate 210 may be made of transparent materials such as glass, resin, and may also be made of polyester compound, paper or other materials.

The width of (the width in the first direction D1) the flowing space 212 for liquid sample and the height (the height in the second direction D2) of the flowing space 212 for liquid sample may be set according to specific implementation demands. In some embodiments, the width and the height of the flowing space 212 for liquid sample may be in nanometer scale (for example, 1-100 nanometers). In some embodiments of the present disclosure, the flowing space 212 for liquid sample may be formed on a silicon substrate, a glass substrate or a polymer substrate through photolithography or etching. Polymer substrate may be made of PDMS (polydimethylsiloxane) or PMMA (polymethyl methacrylate).

In some embodiments, a hydrophobic membrane layer/hydrophilic membrane layer may be applied on an inner wall of the flowing space 212, such that the liquid sample may flow or temporarily stay in the flowing space 212 according to detection demands. For example. Teflon-AF (amorphous fluoropolymer) can minimize the adhesion of the liquid sample on the inner wall of the flowing space 212 for liquid, such that the liquid sample can flow according to detection demands.

Figure 11B:
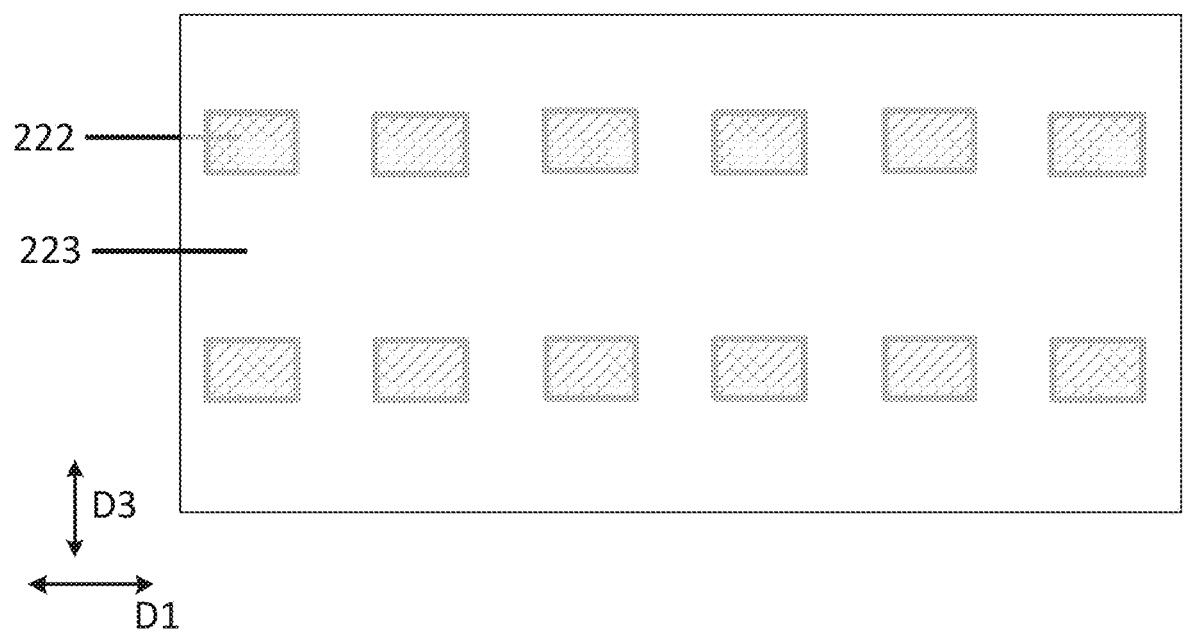
FIG. 11B is a plan view of a grating and an optical waveguide structure.

FIG. 11B illustrates a plan view of the grating 222 and the optical waveguide structure 223 corresponding to the fluid-driven substrate 210 as illustrated in FIG. 11A. As illustrated in FIG. 11B, the plurality of gratings 222 are provided on the optical waveguide structure 223.

Figure 11C:
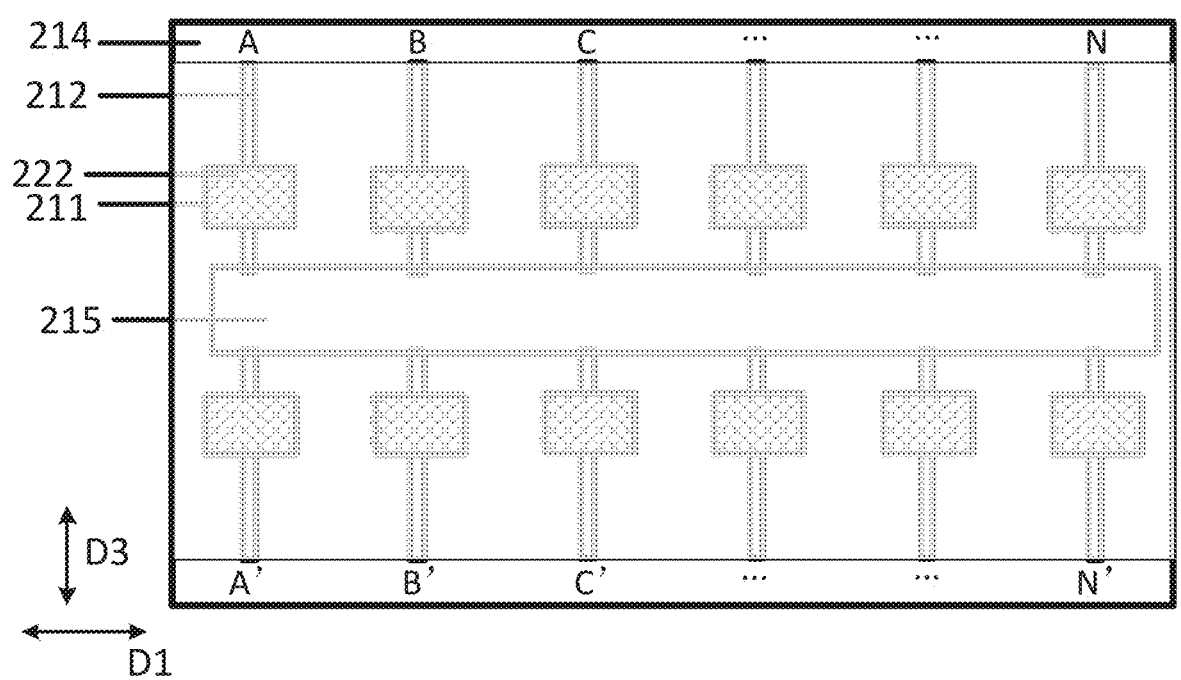
FIG. 11C is a plan view of a grating, an optical waveguide structure and a fluid-driven substrate.

FIG. 11C illustrates a plan view of the grating 222, the optical waveguide structure 223 and the fluid-driven substrate 210 corresponding to FIG. 11A and FIG. 11B. As illustrated in FIG. 11C, the grating 222 and the sub-detection area 211 of the fluid-driven substrate 210 are corresponding arranged, so as to allow the light outputted by the grating 222 to be able to illuminate the sub-detection area 211. As illustrated in FIG. 11C, the flowing space 212 for liquid comprises the sub-detection area 211 and the other area outside of the sub-detection area 211 (for example, the area, which is at the upper side of the sub-detection area 211, of the flow passage and the area, which is at the lower side of the sub-detection area 211, of the flow passage). Because the orthographic projection of the flowing space 212 for liquid sample on the plane (i.e., the paper surface in FIG. 11A) perpendicular to the second direction D2 is a rectangle, the width of the sub-detection area 211 in the first direction D1 is equal to the width of the other area of the flowing space 212 for liquid sample in the first direction D1. As illustrated in FIG. 11C, the width of the sub-filter structure 226 in the first direction D1 is larger than the width of the flowing space 212 for liquid sample in the first direction D1, but embodiments of the present disclosure are not limited to this case. For example, the width of the sub-detection area 211 in the first direction D1 may be greater than the width of the other area of the flowing space 212 for liquid sample in the first direction D1, and the width of the sub-filter structure 226 in the first direction D1 is matched with (for example, the same as) the width of the sub-detection area 211 in the first direction D1. The fluid-driven substrate 210 as illustrated in FIG. 11C comprises A-N and A'-N' flowing spaces 212 for liquid. When the fluid-driven substrate 210 is adopted for detecting a liquid sample that is sensitive to single one wavelength, the liquid sample that is sensitive to single one wavelength is allowed to pass through any one of the A-N and A'-N' flowing spaces 212 for liquid, and during the time period that the liquid sample is in the sub-detection area 211, the grating 222 that is corresponding to the sub-detection area 211 is allowed to reflect the light emitted by the sub-light source 221 on the liquid sample in the sub-detection area 211, and physical reaction (scattering, transmission or absorption) is present between the light reflected by the grating 222 and the liquid sample, or, the light reflected by the grating 222 excites the liquid sample to emit light (for example, the light reflected by the grating 222 is converted into the light emitted by the liquid sample through wavelength conversion), or, the light reflected by the grating 222 involves chemical reaction of the liquid sample; and then the light that passes the liquid sample is incident on the sensor 230 corresponding to the sub-detection area 211. The detection information (for example, the content of a substance in the liquid sample) is obtained after the signal outputted by the sensor 230 is analyzed.

For example, when the fluid-driven substrate 210 is adopted for simultaneously detecting a plurality of liquid samples, the plurality of liquid samples (for example, 10 liquid samples) are allowed to respectively passes any ten flowing spaces 212 for liquid from the A-N and A'-N' flowing spaces 212 for liquid, and corresponding gratings 222 are allowed to reflect the beams of light emitted by the sub-light sources 221 on the liquid samples in the sub-detection areas 211. Then, the beams of light that respectively pass the liquid samples are incident on the sensors 230. The detection information (for example, the contents of a substance in the ten liquid samples) is obtained after the signals outputted by the sensors 230 are analyzed.

Figure 12A:
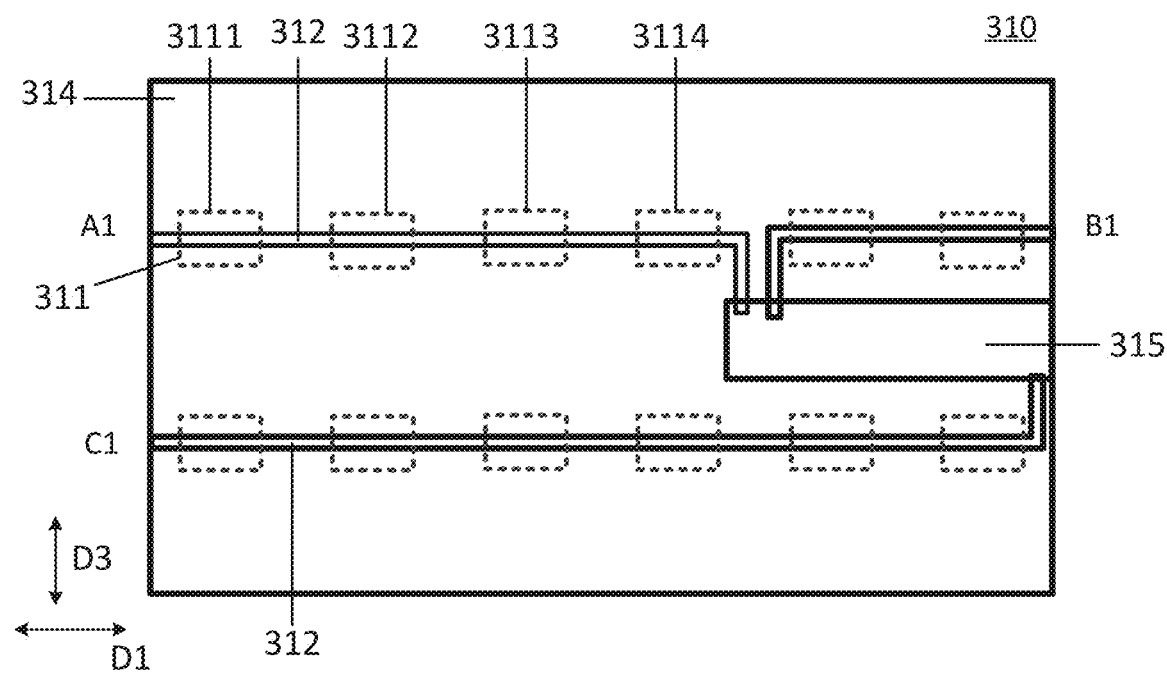
FIG. 12A is a plan view of another fluid-driven substrate provided by at least one embodiment of the present disclosure.
Figure 12B:
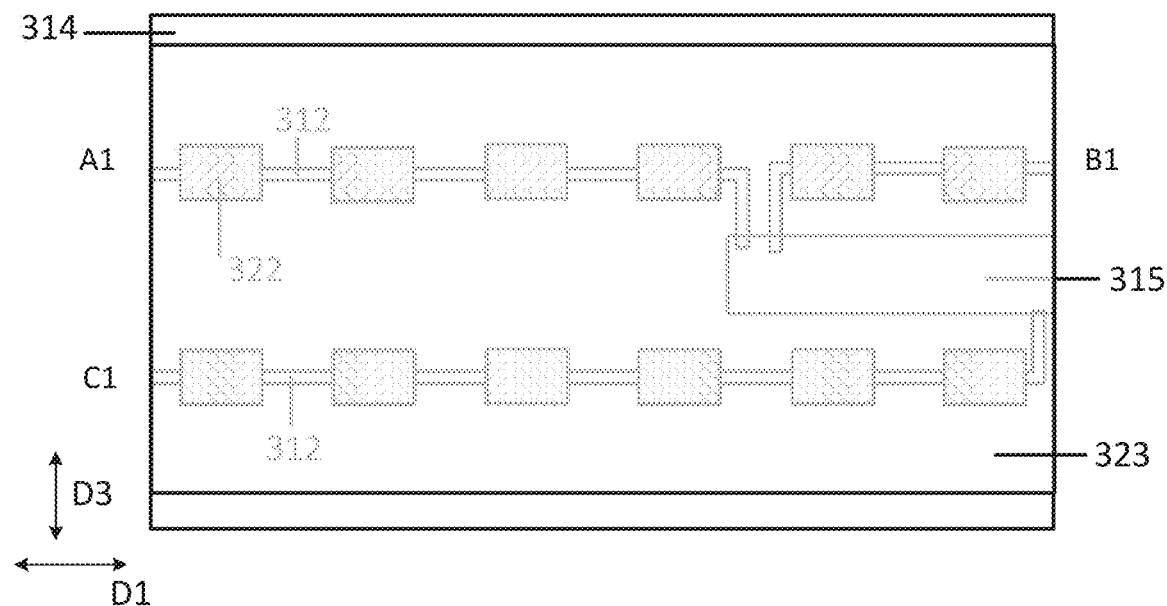
FIG. 12B is another plan view of a grating, an optical waveguide structure and a fluid-driven substrate.

FIG. 12A illustrates a plan view of a fluid-driven substrate 310 according to some embodiments of the present disclosure, the fluid-driven substrate 310 can be applied in the fluid detection panel 100 and the fluid detection panel 200. As illustrated in FIG. 12A, the fluid-driven substrate 310 comprises a transparent substrate 314, and a flowing space 312 for liquid sample (for example, the microflow passage)

and a liquid tank 315, which are on the transparent substrate 314. As illustrated in FIG. 12A, the terminal end of the flowing space 312 for liquid sample connects the liquid tank 315, and therefore, the liquid sample after detection can flow into the liquid tank 315 for temporary storage. FIG. 12B illustrates a plan view of the grating 322, the optical waveguide structure 323 and the fluid-driven substrate 310 corresponding to FIG. 12A. As illustrated in FIG. 12B, the grating 322 and the detection area 311 of the fluid-driven substrate 310 are corresponding arranged, such that the light outputted from the grating 322 can illuminate on the detection area 311.

As illustrated in FIG. 12A and FIG. 12B, the flowing space 312 for liquid at the left upper side is corresponding to four detection area. After the liquid sample enters the flowing space 312 for liquid at the left upper side from entrance A1, the liquid sample sequentially passes the above-mentioned four detection areas 311 (i.e., a first sub-detection area 3111, a second sub-detection area 3112, a third sub-detection area 3113 and a fourth sub-detection area 3114), and flows into the liquid tank 315 for temporary storage. When the liquid sample is in the first sub-detection area 3111, the light (the light that is within the first wavelength range) reflected by the grating 322 that is corresponding to the first sub-detection area 3111 can be incident on the liquid sample in the first sub-detection area 311, and physical reaction (scattering, transmission or absorption) is present between the light that is within the first wavelength range and the liquid sample, or, the light that is within the first wavelength range excites the liquid sample to emit light (for example, the light that is within the first wavelength range is converted into the light emitted by the liquid sample through wavelength conversion), or, the light that is within the first wavelength range involves chemical reaction of the liquid sample; and then the light that passes the liquid sample is incident on the sensor corresponding to the first sub-detection area 311, for example, f detection information is obtained after the signal outputted by the sensor is analyzed. Similarly, when the liquid sample sequentially in the second sub-detection area, the third sub-detection area and the fourth sub-detection area, second detection information, third detection information and fourth detection information can be obtained. For example, the first detection information, the second detection information, the third detection information and the fourth detection information may be the information of the substances constituting the liquid sample (or information of whether or not a predetermined substance is included).

As illustrated in FIG. 12A and FIG. 12B, the flowing space 312 for liquid at the right upper side is corresponding to two detection areas. After the liquid sample enters the flowing space 312 for liquid at the right upper side from entrance B1, the liquid sample sequentially passes the above-mentioned two detection areas 311, and flows into the liquid tank 315 for temporary storage. As illustrated in FIG. 12A and FIG. 12B, the flowing space 312 for liquid at the lower side is corresponding to six detection areas, and after the liquid sample enters the flowing space 312 for liquid at the lower side from entrance C1, the liquid sample sequentially passes the above-mentioned six detection areas 311, and flows into the liquid tank 315 for temporary storage.

It should be noted that, the corresponding relationship between the flowing space 312 for liquid and the detection area 311 as illustrated in FIG. 12A and FIG. 12B is only an example, according to specific implementation demands, other corresponding relation between the flowing space 312 for liquid and the detection area 311 may be set, and more flowing space 212 for liquid may be set.

In the following, concrete method of detecting whether or not the liquid sample includes a certain type substance or certain types of substances by the fluid detection panel is illustrative described.

If the liquid sample comprises a predetermined certain type substance or certain types of substances, as illustrated in FIG. 8A or FIG. 8B, the light emitted by the sub-light source 221 is incident on the sub-filter structure 226; the sub-filter structure 226 filters the light emitted by the sub-light source, and allows the filtered light to illuminate on the sub-detection area 211; the filtered light reacts with the predetermined certain type substance or certain types of substances of the liquid sample in the sub-detection area 211 and then passes the sub-detection area 211; the light that passes the sub-detection area 211 is incident on the sensor 230, and the sensor 230 converts an optical signal into an electrical signal; the signal processing device receives the electrical signal outputted by the sensor 230, and compares the electrical signal with stored data in a data base, such that the signal processing device can output an analysis result, determine whether or not the liquid sample comprises the certain type substance or certain types of substances, such that one detection is finished.

In some embodiments, as illustrated in FIG. 8A or FIG. 8B, the light emitted by the sub-light source 221 is incident on the sub-filter structure 226; the sub-filter structure 226 filters the light emitted by the sub-light source 221, and allows the filtered light to illuminate on the sub-detection area 211; the filtered light reacts with the liquid sample and then passes the sub-detection area 211; the light that passes the sub-detection area 211 is incident on the sensor 230, and the sensor 230 converts an optical signal into an electrical signal; whether or not the liquid sample comprises the certain type substance or certain types of substances is obtained through analyzing the electrical signal.

The working principle of the fluid detection panel 200 is illustrative described in the following with reference to an example. For example, cyanine dye has a relatively strong absorption for blue-green light (380 nanometers-600 nanometers); when the fluid detection panel is adopted to detect whether or not the liquid sample comprises cyanine dye, the following steps may be executed. Firstly, the fluid-driven substrate 210 is utilized to move the liquid sample to the sub-detection area 211. Secondly, the sub-filter structure 226 is utilized to filter the light emitted by the sub-light source 221, so as to obtain blue light or green light within the wavelength range of 380 nanometers-600 nanometers, and the blue light or green light within the wavelength range of 380 nanometers-600 nanometers is allowed to be incident on the sub-detection area 211, the blue light or green light within the wavelength range of 380 nanometers-600 nanometers reacts with the liquid sample; in this step, if the liquid sample comprises cyanine dye, the liquid sample absorbs part of the blue light or green light, the larger the concentration (or the content) of the cyanine dye, the stronger the absorption of the liquid sample to the blue light or green light; correspondingly, the weaker the intensity of blue light or green light that passes the sub-detection area 211, such that the blue light or green light that passes the sub-detection area 211 carries the information of the liquid sample. Next, the light that passes the sub-detection area 211 is incident on the sensor 230, and the sensor 230 outputs an electrical signal which is corresponding to the intensity of the light according to the light that is incident on the sensor 230, such that whether or not the liquid sample comprises cyanine dye can be determined according to the electrical signal outputted by the sensor 230. For example, in the case where the electrical signal outputted by the sensor 230 is reduced significantly, it can be determined that the liquid sample comprises cyanine dye. Furthermore, the concentration (or the content) of cyanine dye can be further determined with reference to the corresponding relationship, which is pre-stored in a data base, between the concentration (or the content) of the cyanine dye and absorption.

In some embodiments, the electrical signal outputted by the sensor is provided to the signal processing device, if the signal processing device cannot find a corresponding material composition information that is matched with the electrical signal through querying the database, the liquid sample does not comprise the certain type substance or certain types of substances. For example, during comparing the electrical signal with the data in the database, if it is found that the substance of the liquid sample are not recorded in the database, that is, the liquid sample comprises an unknown substance, the grating 322 and the fluid-driven substrate 310 as illustrated in FIG. 12B may be adopted to detect the unknown substance in the liquid sample. For example, the liquid sample enters the flowing space 312 for liquid at the left upper side of the fluid-driven substrate 310 from the entrance A1 and sequentially passes the four detection areas 311; the sensor obtains the first detection signal, the second detection signal, the third detection signal and the fourth detection signal, and the type of the unknown substance in the liquid sample can be determined through analyzing the first detection signal, the second detection signal, the third detection signal and the fourth detection signal.

For example, the fluid detection panel 200 as illustrated in FIG. 8A or FIG. 8B substantially can basically accomplish detection of any substance or any bacteria, and have the advantage of high resolution. For example, because the liquid sample separately reacts with the light (at a pre-determined wavelength) that is outputted from each of the sub-filter structure 226, the detection accuracy of the fluid detection panel 200 is relatively high, the error rate is relatively small, and other instable factors caused by cross talk is not existed.

The fluid detection panel provided by embodiments of the present disclosure can be reused. The fluid detection panel can be used to detect different liquid samples multiple times through cleaning the fluid detection panel after each detection is finished. It should be noted that, embodiments of the present disclosure is not limited to detect the liquid sample in the fluid-driven substrate.

The fluid-driven substrate provided by embodiments of the present disclosure may be various types or according to various principles. For example, the fluid-driven substrate may be a microfluidic substrate according to dielectric wetting effect, a microfluidic substrate according to driven of ultrasonic, a microfluidic substrate according to driven of air current, or the like, and no limitation will be given in embodiments of the present disclosure in this respect. The structure and working principle of a fluid-driven substrate is illustratively described in the following with reference to FIG. 13A and FIG. 13B, but the fluid-driven substrate of the fluid detection panel adopted by embodiments of the present disclosure is not limited to the fluid-driven substrate as illustrated in FIG. 13A and FIG. 13B.

Figure 13A:
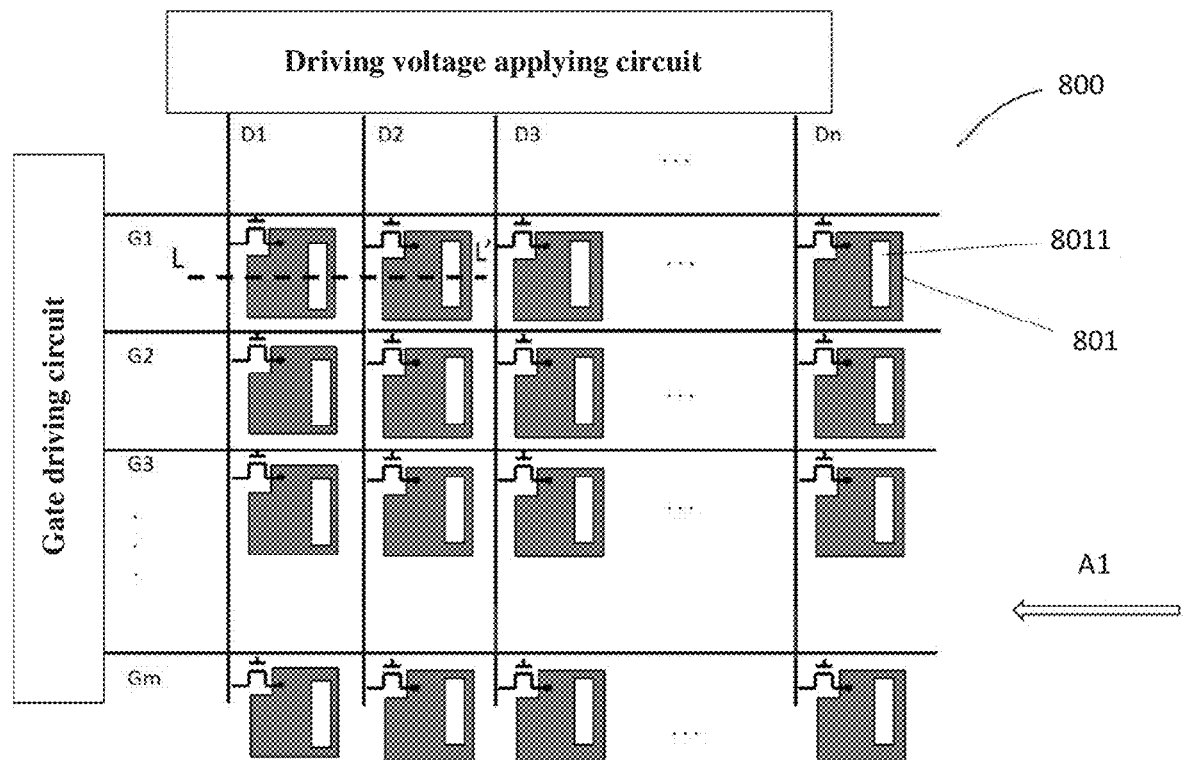
FIG. 13A is a plan view of a driving electrode array of a fluid-driven substrate.

FIG. 13A is a schematic plan view of a driving electrode array of a fluid-driven substrate 800 provided by some embodiments of the present disclosure. The fluid-driven substrate is a fluid-driven substrate based on dielectric wetting effect. As illustrated in FIG. 13A, the fluid-driven substrate 800 includes a plurality of driving electrodes 801, the plurality of driving electrodes 801 are arranged in an electrode array with a plurality of rows and a plurality of columns, and the plurality of driving electrodes 801 are insulated with each other. For example, each of the driving electrodes 801 belongs to one driver unit. The electrode array can drive liquid droplets including the sample to move (e.g., to move along a row direction A1 of the electrode array) in the case where the driving signal is applied by the electrode array can, and the electrode array can also drive the liquid droplets to perform other operations, such as breaking up, aggregating the liquid droplets, etc.

As illustrated in FIG. 13A, the fluid-driven substrate 800 further includes a plurality of first signal lines GI-Gm and a plurality of second signal lines D1-Dn. The plurality of first signal lines GI-Gm are connected to, for example, a gate driving circuit, and the plurality of second signal lines D1-Dn are connected to a driving voltage applying circuit. For example, the gate driving circuit and the driving voltage applying circuit may be directly formed on the fluid-driven substrate 800, or the gate driving circuit may be separately formed as a gate driving chip, and then the gate driving chip is bonded onto the fluid-driven substrate 800.

Figure 13B:
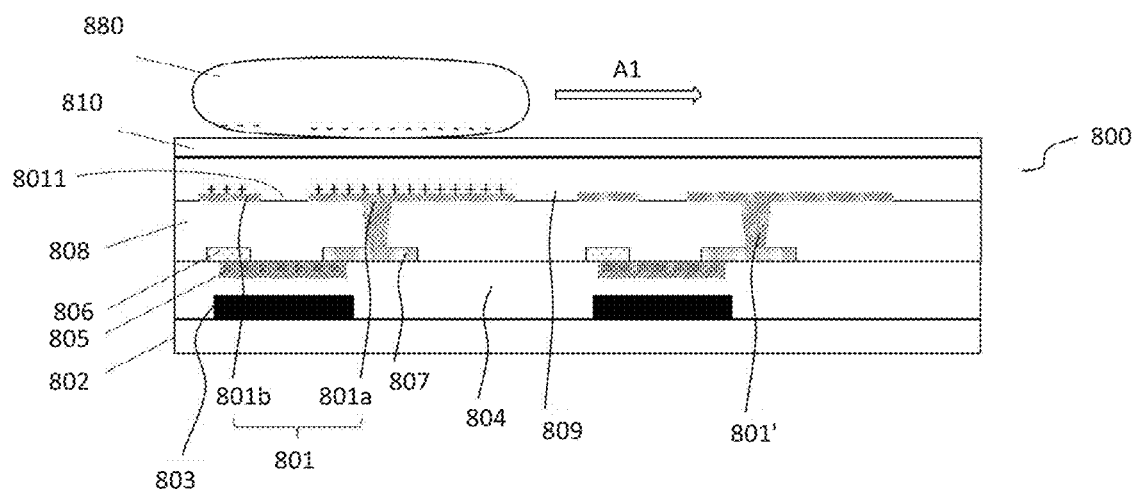
FIG. 13B is a cross-sectional view, along line L-L', of the fluid-driven substrate as illustrated in FIG. 13A.

FIG. 13B is a schematic sectional view of the fluid-driven substrate 800 illustrated in FIG. 13A along a L-L' line. For convenience of description, FIG. 13B also illustrates a liquid droplet 880 including the sample. As illustrated in FIGS. 13A and 13B, the fluid-driven substrate 800 includes the plurality of driving electrodes 801, each of which includes an opening area 8011. The portions of the driving electrodes 801 on opposite sides of the opening area 8011 have different areas. The driving electrode 801 is divided by the opening area 8011 into a first portion 801a and a second portion 801b. For example, through allowing the driving electrode 801 to comprise the first portion 801a and the second portion 801b, the movement or separation of the liquid droplet 880 can be realized more easily.

As illustrated in FIG. 13B, the fluid-driven substrate 800 further includes a switching element (for example, a thin film transistor). The switching element includes a gate electrode 803, a gate insulating layer 804, an active layer 805, a first electrode 806, a second electrode 807, and an insulating layer 808. The first portion 801a of the driving electrode 801 is in electrical contact with the second electrode 807 via a through hole in the insulating layer 808.

As illustrated in FIG. 13B, the fluid-driven substrate 800 may further include a base 802, an insulating layer 809 and a hydrophobic layer 810. The hydrophobic layer 810 is formed on the surface, which is configured for carrying and supporting the liquid droplets 880, of the fluid-driven substrate 800. Through providing the hydrophobic layer 810, the liquid droplets 880 can be prevented from penetrating into the fluid-driven substrate 800, the loss of liquid droplets 880 is reduced, and the liquid droplets 880 are facilitated to move on the fluid-driven substrate 800. The insulating layer 809 is configured such that the driving electrode 801 is electrically insulated from the liquid droplets 880. The insulating layer 809 may also function as a planarization layer, such that the fluid-driven substrate 800 has a flat surface. In some exemplary embodiments, the hydrophobic layer 810 may be made of Teflon, the insulating layer 809 may be made of an inorganic insulating material or an organic insulating material (for example, a resin), but the embodiment of the present disclosure is not limited thereto.

The principle of driving liquid to move by the fluid-driven substrate 800 will be exemplarily described below in conjunction with FIG. 13B. In the first time period, the second electrode of the switching element provides a driving signal for the driving electrode 801. Because the voltage that is applied to the driving electrode 801 is, for example, a positive voltage and positive charges are on the driving electrode 801, corresponding induced negative charge is coupled (generated) at the lower portion of the liquid droplets 880 located above the driving electrode 801 (referring to FIG. 13B). In the second time period (the second time period is later than the first time period), when the control electrodes of the switching element that is electrically connected to the driving electrode 801' receive a turned-on signal, the second electrode of the switching element provides a driving signal for the driving electrode 801' while no driving signal is applied to the driving electrode 801 (or the driving electrode 801 is grounded or is discharged through being applied with a negative driving signal). In the second time period, because positive charges are on the driving electrode 801', and induced negative charges are on the lower portion of the liquid droplets 880, the liquid droplets 880 move towards the driving electrode 801' along the direction indicated by the arrow A1 under the attractive force between the positive and negative charges.

At least one embodiments of the present disclosure further provides a fluid detection device, which comprises a signal processing device and a fluid detection panel provided by any one of the embodiments of the present disclosure. The signal processing device connects the sensor of the fluid detection panel.

Figure 14:
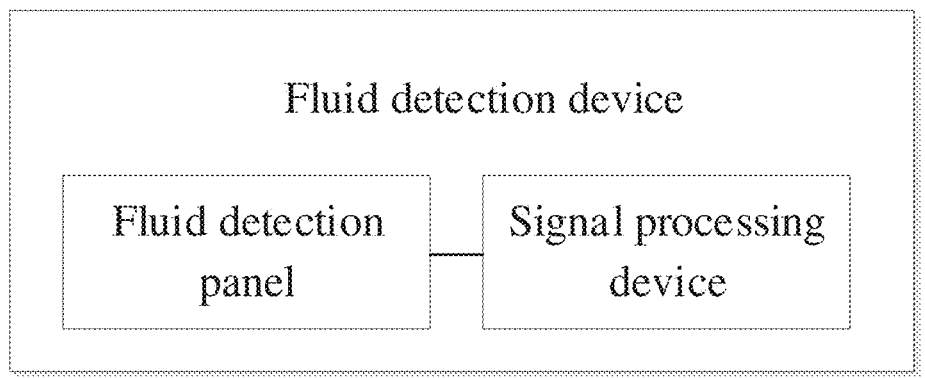
FIG. 14 is an illustrative block diagram of a fluid detection device provided by at least one embodiments of the present disclosure.

FIG. 14 is an illustrative block diagram of the fluid detection device provided by at least one embodiments of the present disclosure. As illustrated in FIG. 14, the fluid detection device comprises a signal processing device and a fluid detection panel. The fluid detection panel may be the above-mentioned fluid detection panel 100, fluid detection panel 200 or fluid detection panel 300. The concrete structure and the working principle of the signal processing device and the fluid detection panel may refer to the above-mentioned embodiments, and no further description will be given here.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A fluid detection panel, comprising:
    a filter structure, configured to filter light emitted by a light source;
    a fluid-driven substrate, which comprises a detection area and is configured to enable a liquid sample to move to the detection area; and
    a sensor, configured to receive light which is emitted by the light source and firstly passes the filter structure and then passes the detection area,
    wherein the detection area comprises a plurality of sub-detection areas, a distance between adjacent sub-detection areas is greater than a size of each of the plurality of sub-detection areas in a same direction, and no liquid sample is located in a region corresponding the distance between adjacent sub-detection areas,
    wherein the filter structure is configured to reflect at least part of light that is emitted by the light source and within a pre-determined wavelength range, and to transmit light that is emitted by the light source and outside of the pre-determined wavelength range.

2. The fluid detection panel according to claim 1, wherein the fluid-driven substrate comprises a plurality of driving electrodes, and
    the plurality of driving electrodes are configured to be able to drive the liquid sample to move to the detection area.

3. The fluid detection panel according to claim 1, further comprising the light source, wherein the filter structure is between the light source and the detection area.

4. The fluid detection panel according to claim 3, wherein the filter structure comprises a plurality of sub-filter structures; and
    an orthographic projection of each of the plurality of sub-filter structures on the fluid-driven substrate overlaps one of the plurality sub-detection areas.

5. The fluid detection panel according to claim 4, wherein the light source comprises a plurality of sub-light sources, and
    each of the plurality of sub-light sources is configured to emit light towards one of the plurality sub-detection areas.

6. The fluid detection panel according to claim 5, wherein at least one of the plurality of sub-filter structures comprises a liquid crystal layer and control electrodes; and
    the control electrodes are configured to receive a driven voltage signal, so as to control a peak transmission wavelength of the at least one of the plurality of sub-filter structures.

7. The fluid detection panel according to claim 6, wherein, in a direction perpendicular to the fluid-driven substrate, the control electrodes are at a single side of the liquid crystal layer or at two sides of the liquid crystal layer.

8. The fluid detection panel according to claim 6, further comprising a light shielding pattern, wherein the light shielding pattern is between adjacent two sub-filter structures of the plurality of sub-filter structures.

9. The fluid detection panel according to claim 6, further comprising a control device,
    wherein the control device is configured to apply the driven voltage signal to the control electrodes, and is configured to enable adjacent sub-light sources to emit light at different time.

10. The fluid detection panel according to claim 5, wherein the filter structure further comprises a filter; and
    the filter and the at least one of the plurality of sub-filter structures are stacked with each other, so as to filter light emitted by a sub-light source, or to filter light that passes and exited from at least one of the sub-filter structures.

11. The fluid detection panel according to claim 1, wherein the filter structure comprises a plurality of sub-detection areas;
    and
    an orthographic projection of each of the plurality of sub-filter structures on the fluid-driven substrate overlaps one of the plurality sub-detection areas.

12. The fluid detection panel according to claim 11, wherein at least one of the plurality of sub-filter structures comprises a grating; and a period of the grating is smaller than a wavelength of light within the pre-determined wavelength range.

13. The fluid detection panel according to claim 12, wherein at least two sub-filter structures in the plurality of sub-filter structures are configured to reflect beams of light within different wavelength ranges.

14. The fluid detection panel according to claim 12, wherein the sub-filter structure further comprises an optical waveguide structure; and the grating is on a surface of the optical waveguide structure facing toward the fluid-driven substrate.

15. The fluid detection panel according to claim 14, wherein the optical waveguide structure is configured to leak at least part of light that enters the optical waveguide structure and is within the pre-determined wavelength range, and allow leaked light to interfere with light that is reflected by the sub-filter structure and within the pre-determined wavelength range, so as to enhance the light that is reflected by the sub-filter structure and within the pre-determined wavelength range.

16. The fluid detection panel according to claim 14, further comprising a first light shielding structure and a second light shielding structure, wherein the first light shielding structure is between the fluid-driven substrate and the optical waveguide structure, and an orthographic projection of the first light shielding structure on the optical waveguide structure does not overlap with the grating; and the second light shielding structure is at a side of the optical waveguide structure away from the grating.

17. The fluid detection panel according to claim 1, further comprising the light source, wherein the light source is between the filter structure and the sensor.

18. A fluid detection device, comprising:

a signal processing device, and a fluid detection panel, wherein the signal processing device is connected with the sensor of the fluid detection panel, and the fluid detection panel comprises:

a filter structure, configured to filter light emitted by a light source;

a fluid-driven substrate, which comprises a detection area and is configured to enable a liquid sample to move to the detection area; and a sensor, configured to receive light which is emitted by the light source and firstly passes the filter structure and then passes the detection area, wherein the detection area comprises a plurality of sub-detection areas, a distance between adjacent sub-detection areas is greater than a size of each of the plurality of sub-detection areas in a same direction, and no liquid sample is located in a region corresponding the distance between adjacent sub-detection areas, wherein the filter structure is configured to reflect at least part of light that is emitted by the light source and within a pre-determined wavelength range, and to transmit light that is emitted by the light source and outside of the pre-determined wavelength range.

* * * * *